US010750302B1

(12) United States Patent
Zhong et al.

(10) Patent No.: US 10,750,302 B1
(45) Date of Patent: Aug. 18, 2020

(54) WEARABLE DEVICE DON/DOFF SENSOR

(71) Applicant: AMAZON TECHNOLOGIES, INC., Seattle, WA (US)

(72) Inventors: Xuan Zhong, Mountain View, CA (US); Chia-Jean Wang, Palo Alto, CA (US); Bozhao Tan, Sunnyvale, CA (US); Han Zhang, Mountain View, CA (US); Jianchun Dong, Palo Alto, CA (US); Geng Ye, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/276,649

(22) Filed: Sep. 26, 2016

(51) Int. Cl.
*H04R 29/00* (2006.01)
*H04R 1/02* (2006.01)
*G06F 3/16* (2006.01)
*H04R 17/00* (2006.01)

(52) U.S. Cl.
CPC ............. *H04R 29/001* (2013.01); *G06F 3/16* (2013.01); *H04R 1/028* (2013.01); *H04R 17/00* (2013.01)

(58) Field of Classification Search
None
See application file for complete search history.

(56) References Cited

U.S. PATENT DOCUMENTS

| | | | | |
|---|---|---|---|---|
| 9,031,273 B2* | 5/2015 | Dong | ..................... | H04R 1/028 381/327 |
| 9,740,842 B1* | 8/2017 | Wong | ..................... | G06F 21/32 |
| 9,998,817 B1* | 6/2018 | Liu | ..................... | H04R 1/1041 |
| 2011/0092157 A1* | 4/2011 | Clark | ..................... | H04M 1/6066 455/41.2 |
| 2013/0249849 A1* | 9/2013 | Wong | ..................... | G06F 1/3231 345/174 |
| 2014/0064536 A1* | 3/2014 | Kim | ..................... | G02B 27/017 381/333 |
| 2014/0363003 A1* | 12/2014 | Kupershmidt | ......... | H04R 29/00 381/58 |
| 2014/0363033 A1* | 12/2014 | Heiman | ..................... | H04R 1/46 381/151 |
| 2015/0256659 A1* | 9/2015 | Hernandez Rueda | ..................... | H04M 1/6066 455/575.6 |
| 2016/0238408 A1* | 8/2016 | Kannappan | ..................... | G01C 25/00 |
| 2016/0253487 A1* | 9/2016 | Sarkar | ..................... | H04L 63/08 726/7 |
| 2017/0061647 A1* | 3/2017 | Starner | ..................... | G06T 7/60 |

* cited by examiner

*Primary Examiner* — Paul W Huber
(74) *Attorney, Agent, or Firm* — Lindauer Law, PLLC

(57) ABSTRACT

A user interface for a head-mounted wearable device provides many functions to a user. Information about whether the device is being worn (donned) or not worn (doffed) may be acquired in several ways. Force sensing resistors in the device may provide output indicative of the pressure associated with wearing the device. Output from a bone conduction (BC) microphone may be analyzed to determine if the device is in use. Piezoelectric BC speakers typically used to present audio output to a wearer provide changes in voltage corresponding to a change in pressure associated with wearing the device. A BC speaker may emit a signal that is detected by the BC microphone, with changes in the signal strength being used to determine if the device is donned or doffed.

23 Claims, 14 Drawing Sheets

WEARABLE DEVICE DON/DOFF SENSOR

BACKGROUND

Wearable devices provide many benefits to users, allowing easier and more convenient access to information and services.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
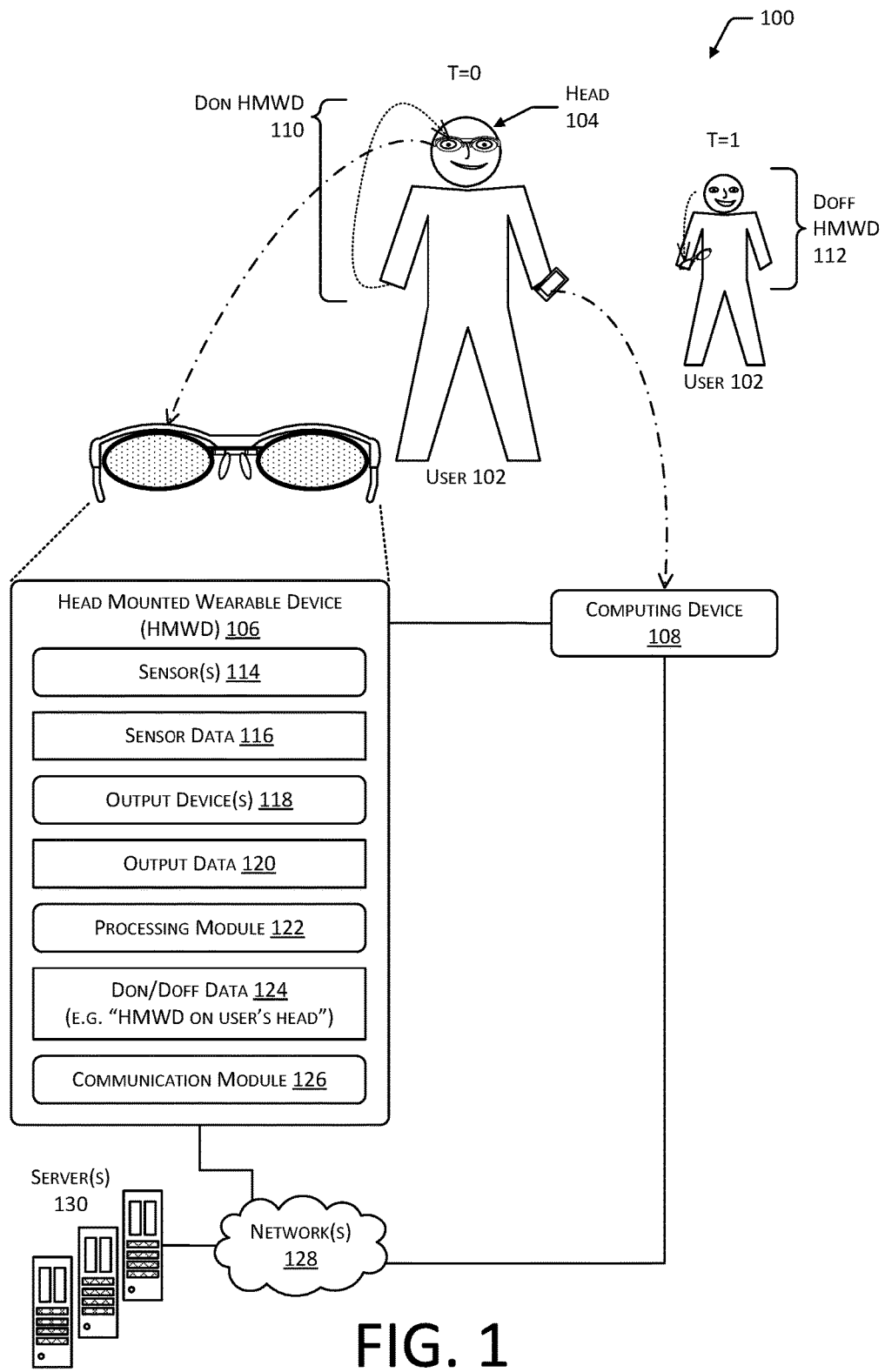
FIG. 1 depicts a system including a head-mounted wearable device with sensors to determine if the device is donned or doffed, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

The structures depicted in the following figures are not necessarily according to scale. Furthermore, the proportionality of one component to another may change with different implementations. In some illustrations, the scale of a proportionate size of one structure may be exaggerated with respect to another to facilitate illustration, and not necessarily as a limitation.

DETAILED DESCRIPTION

Wearable devices provide many benefits to users, allowing easier and more convenient access to information and services. For example, a head-mounted wearable device (HMWD) having a form factor similar to eyeglasses may provide a ubiquitous and easily worn device that facilitates access to information.

The HMWD may operate independently as a standalone device, or may operate in conjunction with another computing device. For example, the HMWD may operate in conjunction with a smartphone, tablet, network service operating on servers, and so forth. The HMWD includes sensors and output devices that provide a user interface to the user. In one implementation, the HMWD may use the computing device to provide access to a wide area network, compute resources, data storage, a display for image output, and so forth.

The HMWD may be worn (donned) or not worn (doffed) by the user at different times. For example, the HMWD may be donned during the day and doffed at night prior to sleep. During the day, the user may don or doff the HMWD for various reasons or for various purposes.

Information about whether the HMWD is donned or doffed may be used in a variety of ways. For example, when doffed, the HMWD may be placed into a very low power or "sleep" mode to reduce power consumption, thus improving overall battery life. In another example, when doffed the HMWD may operate sensors in an alternative mode, such as transitioning a microphone to a far-field mode to support acquisition of speech from farther away. In yet another example, when donned, status information about the HMWD being worn may be presented to other users, such as letting them know the user is wearing the HMWD and is available for communication.

Sensors associated with the HMWD may be used to generate don/doff data. The don/doff data provides information indicative of the current state of wear of the HMWD. For example, don/doff data may indicate if the HMWD is being worn or not being worn at a particular time.

The sensors include one or more sensors, transducers, or other devices that provide sensor data responsive to an input. Sensor data from these sensors is processed to determine the don/doff data.

The HMWD may use force sensitive resistors (FSR) to determine don/doff data. The HMWD may have temples which, during wear by the user, are positioned above the ear. The FSR sensors may be arranged on each of the temples to gather information about a contact force exerted between the temple and the head of the user. Continuing the example, the HMWD may be designed such that, when worn, the temples exert a slight pressure inward towards the center of the user's head. In one implementation, if both the FSRs detect that the applied pressure is above a threshold value for more than a specified amount of time, don/doff data is generated indicating the HMWD is in a "donned" state, or is being worn. Likewise, if both the FSRs detect that the applied pressure is below a threshold value for more than the specified amount of time, don/doff data is generated indicating the HMWD is in a "doffed" state.

The HMWD may utilize a proximity sensor to determine don/doff data. The proximity sensor may use capacitive, infrared, or other techniques to determine the presence of an object. Don/doff data may be generated responsive to the proximity sensor's detection of an object, such as the user's head.

The HMWD may utilize a bone conduction (BC) microphone to determine don/doff data. BC microphone data may be analyzed to determine if the vibrations detected by the BC microphone are consistent with the user's head or not. For example, the BC microphone data may be analyzed to detect the (circulatory) pulse of the user. In another example, characteristics such as a zero crossing rate (ZCR), energy of the signal, and so forth may be assessed. Continuing the example, if the ZCR is high and the energy is low, the BC microphone is likely detecting vibrations that are not originating from the user. In another implementation, a classifier or other machine learning system may be trained to classify if the BC microphone data is indicative of a donned or doffed state.

The HMWD may include bone conduction (BC) speakers to provide audio output that is perceptible to the user. For example, the BC speakers may be in contact with the skull of the user and may emit vibrations into the skull. These vibrations are perceived within the head of the user as sound. In some implementations, the BC speakers may utilize piezoelectric or other mechanisms that produce a voltage or current responsive to a force. For example, pushing on a piezoelectric element generates a time-varying voltage, as does the relation of the piezoelectric element after pressure is released.

The HMWD may acquire BC speaker output from the piezoelectric or other mechanism when the speaker is not being used to emit a vibration. By analyzing the BC speaker data, it is possible to determine if a pressure is being applied to or removed from the BC speaker. If pressure is being applied, the HMWD may be donned. If pressure is being released, the HMWD may be doffed.

The HMWD may utilize both the BC speaker and the BC microphone to determine don/doff data. For example, the BC speaker may emit a vibration and the BC microphone may acquire BC mic data at the same time. When the HMWD is donned, the head of the user provides an effective medium for the emitted vibration to travel from the BC speaker to the BC microphone. As a result, the amplitude of the signal received by the BC microphone is relatively high, above a threshold. In comparison, when the HMWD is doffed, the intervening air between the BC speaker and the BC microphone provides a relatively poor medium for transfer of the emitted vibration. As a result, the amplitude of the signal received by the BC microphone is relatively low, below the threshold. By comparing the amplitude of the received BC mic data obtained during emission of the vibration with the threshold, the don/doff data may be determined.

In some implementations, one or more of these different sensors or techniques may be combined. For example, input from the FSR sensors and the use of the BC speaker to emit a vibration that's detected by the BC microphone may be combined to provide unambiguous don/doff data.

By using the don/doff data, overall performance of the HMWD and associated systems are improved. For example, when doffed the device may be placed into a low power mode and extending battery life. When donned, the device may provide status information to other services, such as indicating the device is available for use. This improves the overall efficiency of systems that interact with the HMWD by providing them with reliable information as to whether the HMWD is being worn, which facilitates operations such as presenting output to the user, establishing communication with the user by way of the HMWD, and so forth.

Illustrative System

FIG. 1 depicts a system 100 in which a user 102 is wearing on their head 104 a head-mounted wearable device (HMWD) 106 in a general form factor of eyeglasses.

The HMWD 106 may be in communication with one or more affiliated computing devices 108. For example, the HMWD 106 may communicate with the computing device 108 using a personal area network (PAN) such as Bluetooth. The computing device 108 may be used at least in part to provide additional resources, such as access to the network, compute resources, storage, display output, and so forth. The computing devices 108 may comprise a smart phone, tablet, local server, in vehicle computer system, and so forth. For example, the computing device 108 may comprise a smart phone that includes a display. The display of the smart phone may be used to present a graphical user interface.

Depicted is the same user 102 at two times, time T=0 and T=1. At T=0, the user 102 has placed the HMWD 106 on their head 104, donning 110 the HMWD 106. At T=1, the user 102 has removed the HMWD 106 from their head 104, doffing 112 the HMWD 106.

The HMWD 106 may include or be in communication with one or more sensors 114. The sensors 114 may comprise force sensitive resistor (FSR) sensors, proximity sensors, strain gauges, bone conduction (BC) microphones, and so forth. The sensors 114 generate sensor data 116 that is indicative of what the sensors 114 have detected. In comparison, output devices 118 generate output that may be perceived by the user 102. For example, the output devices 118 may comprise bone conduction (BC) speakers, air conduction speakers, display lights, and so forth. Output data 120 is provided to the output device 118 to generate the output. For example, the output data 120 may comprise a pulse code modulated (PCM) stream of audio data that is provided to the BC speaker output device 118 for presentation. In some implementations, output devices 118 may be utilized as sensors 114. For example, the BC speaker may be used to generate BC speaker data. The BC speaker data may be indicative of displacement or movement of the at least a portion of the BC speaker that results from an external applied force, such as when the user's head 104 presses against the BC speaker. The sensors 114 and the output devices 118 are discussed in more detail below with regard to FIG. 2.

A processing module 122 may utilize the sensor data 116 from one or more the sensors 114 or from one or more the output devices 118 used as sensors 114 to determine don/doff data 124. The don/doff data 124 provides information indicative of whether the HMWD 106 is donned 110 or doffed 112. For example, the don/doff data 124 may comprise a single bit binary value in which a "0" indicates a doffed 112 condition and a "1" indicates a donned 110 condition of the HMWD 106. The don/doff data 124 may also include a timestamp. The timestamp may be indicative of a time associated with the acquisition of the data used to make the determination. The processing module 122 may implement one or more of the techniques described below with regard to FIGS. 6-14 to determine the don/doff data 124.

A communication module 126 may be configured to establish communication with other devices. The communication module 126 may use one or communication interfaces to establish communication with the other devices via one or more networks 128. For example, the network 128 may comprise a personal area network, local area network, metropolitan area network, wide area network, and so forth. The HMWD 106 may use the networks 128 to access one or more services that are provided by the other devices. For example, the HMWD 106 may establish communication with one or more servers 130. These one or more servers 130 may provide one or more services, such as automated speech recognition, information retrieval, messaging, and so forth.

The communication module 126 may also be used to establish communications with one or more other users. This communication may be based at least in part on the don/doff data 124. For example, the user 102(1) of the HMWD 106(1) may initiate a real time call (RTC) with the user 102(2) who is determined to be wearing a HMWD 106(2) based on the don/doff data 124 from that device. Audio associated with the RTC may be transferred using the network 128. Management of the call may be facilitated by one or more services executing on the one or more servers 130.

While the HMWD 106 is described in the form factor of eyeglasses, the HMWD 106 may be implemented in other form factors. For example, the HMWD 106 may comprise a device that is worn behind an ear of the user 102, on a headband, as part of a necklace, and so forth. In some implementations, the HMWD 106 may be deployed as a system, comprising several devices that are in communication with one another.

The structures depicted in this and the following figures are not necessarily according to scale. Furthermore, the proportionality of one component to another may change with different implementations. In some illustrations, the size of one structure may be exaggerated with respect to another to facilitate illustration, and not necessarily as a limitation.

Figure 2:
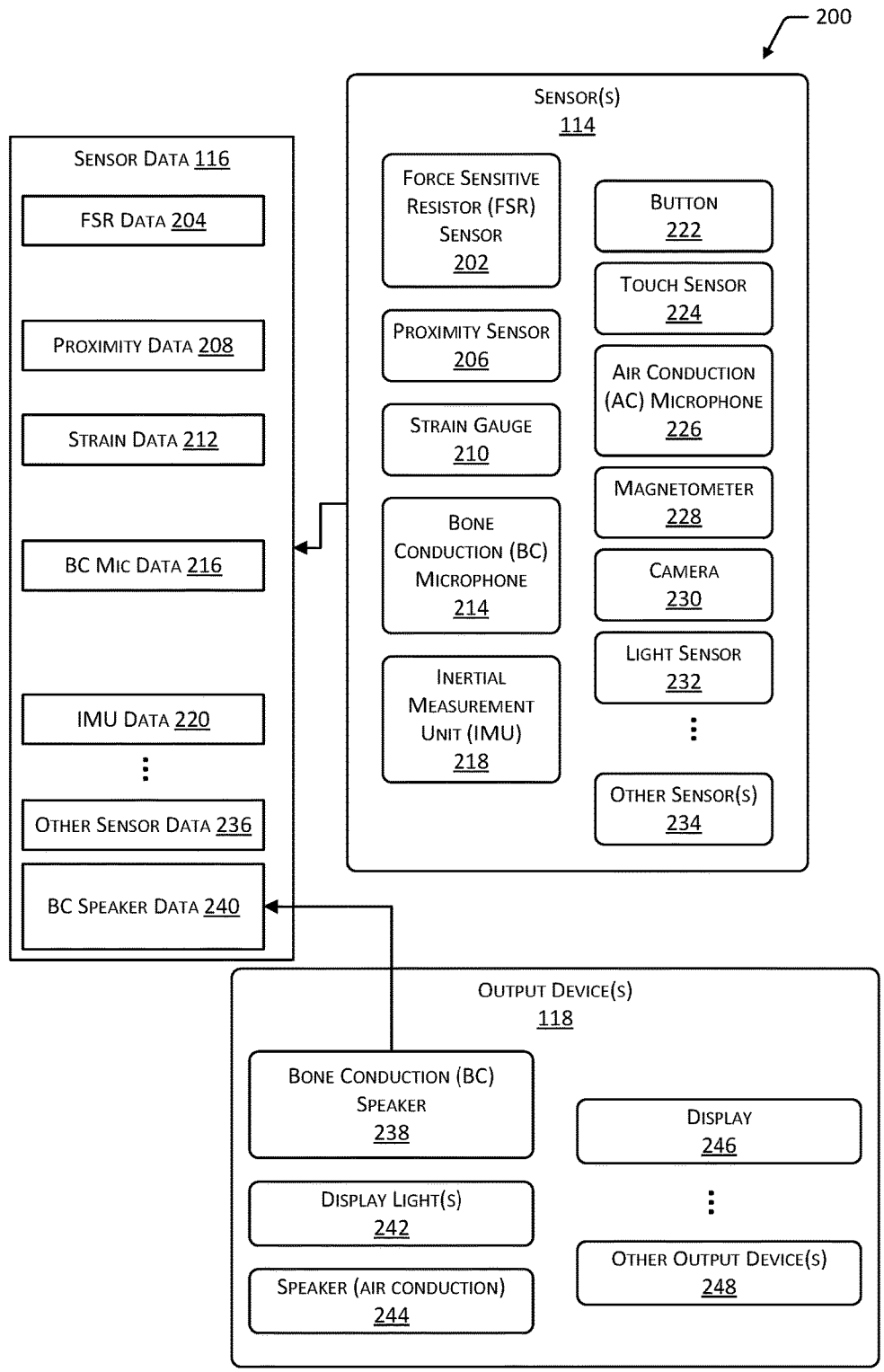
FIG. 2 provides an illustration of several sensors and output devices that may be used by the head-mounted wearable device, according to some implementations.

FIG. 2 provides an illustration 200 of several sensors 114 and output devices 118 that may be used by the HMWD 106, according to some implementations. The sensors 114 may include one or more of the following.

A force sensitive resistor (or force sensing resistor) (FSR) sensor 202 comprises a layer of a material that changes in electrical resistance or conductivity responsive to an applied mechanical force. For example, an increase in force may result in a decrease in the electrical resistance measured across the material. In one implementation, the FSR 202 may comprise a conductive polymer within which electrically conductive and nonconductive particles are suspended. The material to change electrical resistance may be arranged between the first electrode and the second electrode. Electrical circuitry may be used to determine electrical resistance between the first electrode and the second electrode. During operation, the FSR sensor 202 produces FSR data 204. The FSR data 204 may include one or more force measurement values (FMVs) that are indicative of a magnitude of a mechanical force that is applied to the FSR sensor 202. In some implementations, the FSR data 204 may include one or more timestamps. For example, each FMV may have an associated timestamp indicative of when that value was measured, acquired, and so forth. The FSR data 204 may also include information indicative of the particular FSR sensor 202 that generated the FMV.

A proximity sensor 206 determines presence or absence of an object such as the head 104. The proximity sensor 206 may use optical, electrical, ultrasonic, electromagnetic, or other techniques to determine a presence of the head 104. In one implementation, the proximity sensor 206 may use an optical emitter and an optical detector to determine proximity. For example, an optical emitter may emit light, a portion of which may then be reflected by the object back to the optical detector to provide an indication that the head 104 is proximate to the proximity sensor 206. In other implementations, the proximity sensor 206 may comprise a capacitive sensor configured to provide an electrical field and determine a change in electrical capacitance due to presence or absence of the head 104 within the electrical field. The proximity sensor 206 may generate proximity data 208. For example, the proximity data 208 may comprise a single bit binary value that indicates whether an object is detected or not. In some implementations, the proximity data 208 may include a timestamp indicative of when the proximity was measured, acquired, and so forth.

A strain gauge 210 provides information indicative of an amount of mechanical deflection. For example, the strain gauge 210 may be configured to determine an amount of flexure in a temple of the HMWD 106. The strain gauge 210 may generate strain data 212. For example, the strain data 212 may comprise an eight bit value indicative of a direction and magnitude of displacement of a substrate to which the strain gauge 210 is affixed. The strain data 212 may include a timestamp indicative of when the strain was measured, acquired, and so forth.

The BC microphone 214 may comprise a device that is able to generate output indicative of audio frequency vibrations having frequencies occurring between about 10 hertz and at least 22 kilohertz (kHz).

In some implementations, the BC microphone 214 may be sensitive to a particular band of audio frequencies within this range. For example, the BC microphone 214 may be sensitive from 100 Hz to 4 kHz. In one implementation, the BC microphone 214 may comprise an accelerometer. For example, the BC microphone 214 may comprise a piezoceramic accelerometer in the "BU" product family as produced by Knowles Electronics LLC of Itasca, Ill., USA. Continuing the example, the Knowles BU-23842 vibration transducer provides an analog output signal that may be processed as would the analog output from a conventional air conduction microphone. The accelerometer may utilize piezoelectric elements, microelectromechanical elements, optical elements, capacitive elements, and so forth.

In another implementation, the BC microphone 214 comprises a piezoelectric transducer that uses piezoelectric material to generate an electronic signal responsive to the deflection of the piezoelectric material responsive to vibrations. For example, the BC microphone 214 may comprise a piezoelectric bar device.

In yet another implementation, the BC microphone 214 may comprise electromagnetic coils, an armature, and so forth. For example, the BC microphone 214 may comprise a variation on the balanced electromagnetic separation transducer (BEST) as proposed by Bo E. V. Hakansson of the Chalmers University of Technology in Sweden that is configured to detect vibration.

The BC microphone 214 may detect vibrations using other mechanisms. For example, a force sensitive resistor may be used to detect the vibration. In another example, the BC microphone 214 may measure changes in electrical capacitance to detect the vibrations. In yet another example, the BC microphone 214 may comprise a microelectromechanical system (MEMS) device.

The BC microphone 214 may include or be connected to circuitry that generates BC mic data 216. For example, the accelerometer may produce an analog signal as the output. This analog signal may be provided to an analog to digital converter (ADC). The ADC measures an analog waveform and generates an output of digital BC mic data 216. The BC mic data 216 may include a timestamp indicative of when the strain was measured, acquired, and so forth.

A BC microphone 214 is responsive to the vibrations produced by the user 102, such as while speaking. The BC microphone 214 may be arranged to be in contact with the skin above a bony or cartilaginous structure. For example, where the HMWD 106 is in the form of eyeglasses, nose pads of a nosepiece may be mechanically coupled to the BC microphone 214 such that vibrations of the nasal bone, *glabella*, or other structures upon which the nose pads may rest are transmitted to the BC microphone 214. In other implementations, the BC microphone 214 may be located elsewhere with respect to the HMWD 106, or worn elsewhere by the user 102. For example, the BC microphone 214 may be incorporated into the temple of the HMWD 106, a hat or headband.

An inertial measurement unit (IMU) 218 provides information about the movement of the HMWD 106 in space. For example, the IMU 218 may comprise one or more accelerometers, gyroscopes, and so forth. In one implementation, the IMU 218 may comprise three accelerometers, with each accelerometer oriented orthogonal to the others. The IMU 218 may include one or more gyroscopes that sense rotation about one or more mutually orthogonal axes. The IMU 218 may produce IMU data 220. For example, the IMU data 220 may comprise digital data indicative of a vector value such as a direction and magnitude of an acceleration.

A button 222 may comprise a switch or other mechanism that is responsive to an external force. For example, the button 222 may comprise a spring-biased switch that, when depressed, establishes an electric connection. The button 222 may produce button data indicative of the activation of the button 222.

A touch sensor 224 is responsive to a touch by the user 102 or another object. For example, the touch sensor 224 may comprise a capacitive touch sensor, a force sensitive resistor touch sensor, an optical touch sensor, and so forth. Touch sensor data may be generated that is indicative of the location, direction, duration, and so forth, of the touch.

An air conduction (AC) microphone 226 may comprise a diaphragm, MEMS element, or other elements that move in response to the displacement of air by sound waves. Air conduction mic data may be generated that is indicative of the sound detected by the AC microphone 226.

A magnetometer 228 provides information about ambient magnetic fields, such as the terrestrial magnetic field. Output from the magnetometer 228 may be used to determine a change heading with respect to the Earth's magnetic field. In some implementations, the IMU 218 may include the magnetometer 228. Magnetometer data may be generated that is indicative of a magnetic heading, rate of turn, and so forth.

A camera 230 may be used to acquire image data. The camera 230 may be configured to detect light in one or more wavelengths including, but not limited to, terahertz, infrared, visible, ultraviolet, and so forth. The camera 230 may comprise one or more charge coupled devices (CCD), complementary metal oxide semiconductor (CMOS) devices, microbolometers, and so forth.

A light sensor 232 may one or more of a photodetector, semiconductor junction, or other device that is sensitive to the presence or absence of light. The light sensor 232 may comprise an ambient light sensor that provides information indicative of the level of illumination present at the HMWD 106.

Other sensors 234 may be present to generate other sensor data 236. For example, the other sensors 234 may include a barometer, chemical sensor, and so forth.

A bone conduction (BC) speaker 238 may be used to generate vibrations in a material proximate thereto. The BC speaker 238 may be typically used to provide audio output to the user 102. For example, the BC speaker 238 may be placed in physical contact with the head 104 the user 102. During presentation of sounds, the BC speaker 238 may emit vibrations that are transferred to the head 104 and are perceived to the ear of the user 102 as sound.

The BC speaker 238 may use various mechanisms to emit the vibrations. These mechanisms may include, but are not limited to, the following: voice coils, piezoelectric elements, magnetorestrictive elements, electrostatic elements, and so forth. For example, the BC speaker 238 may comprise a piezoelectric material such as a piezo ceramic, that mechanically expands or contracts responsive to the application of an electric signal.

In some situations, the BC speaker 238 may be used as a sensor 114 instead of or in addition to being an output device 118. The sensor data 116 may include BC speaker data 240 generated by the BC speaker 238 when not being driven to emit a vibration. For example, when the BC speaker 238 uses a piezoelectric material to emit vibrations, the piezoelectric material when compressed or released from compression will generate an electric signal. The BC speaker data 240 comprises information about this electric signal. For example, the voltage generated may be digitized using analog to digital converter (ADC) and represented as a digital value.

The output devices 118 may include one or more display lights 242. The display lights 242 may comprise one or more light-emitting diodes, quantum dots, incandescent lamps, electroluminescent materials, and so forth. When activated, a display light 242 emits light. One or more display lights 242 may be positioned within the field of view of the user 102 while the HMWD 106 is worn on the head 104. For example, one or more display lights 242 may be arranged just above one or both lenses of the HMWD 106.

An air conduction speaker 244 that operates by air conduction to the ear of may also be used to provide audio output to the user 102. For example, the air conduction speaker 244 may comprise a diaphragm that is moved to generate sound waves in the air. The air conduction speaker 244 may use one or more mechanisms to generate the output. These mechanisms may include, but are not limited to, the following: voice coils, piezoelectric elements, magnetorestrictive elements, electrostatic elements, and so forth.

A display 246 may be provided in some implementations. The display 246 is configured to present an image to the user 102 or detected by a light-sensitive sensor such as a camera or an optical sensor. For example, the display 246 may comprise a liquid crystal display that manipulates rows and columns of picture elements to form an image.

In some implementations, the display 246 may be configured to produce output in one or more of infrared, visible, or ultraviolet light. The output may be monochrome or color.

The display 246 may be emissive, reflective, or both. An emissive display output device 118, such as using light emitting diodes (LEDs), is configured to emit light during operation. In comparison, a reflective display output device 118, such as using an electrophoretic element, relies on ambient light to present an image. Backlights or front lights may be used to illuminate non-emissive display to provide visibility of the output in conditions where the ambient light levels are low.

The display 246 may include, but are not limited to, micro-electromechanical systems (MEMS), spatial light modulators, electroluminescent displays, quantum dot displays, liquid crystal on silicon (LCOS) displays, cholesteric displays, interferometric displays, liquid crystal displays (LCDs), electrophoretic displays, and so forth. For example, the display output device 118 may use a light source and an array of MEMS-controlled mirrors to selectively direct light from the light source to produce an image. These display mechanisms may be configured to emit light, modulate incident light emitted from another source, or both. The display 246 may operate as panels, projectors, and so forth.

The display 246 may include image projectors. For example, the image projector may be configured to project an image onto a surface or object, such as a lens or the eye of the user 102. The image may be generated using MEMS, LCOS, lasers, and so forth.

Other output devices 248 may also be used by the HMWD 106. For example, the HMWD 106 may include a dispenser to release particular scents near the nose of the user 102.

Figure 3:
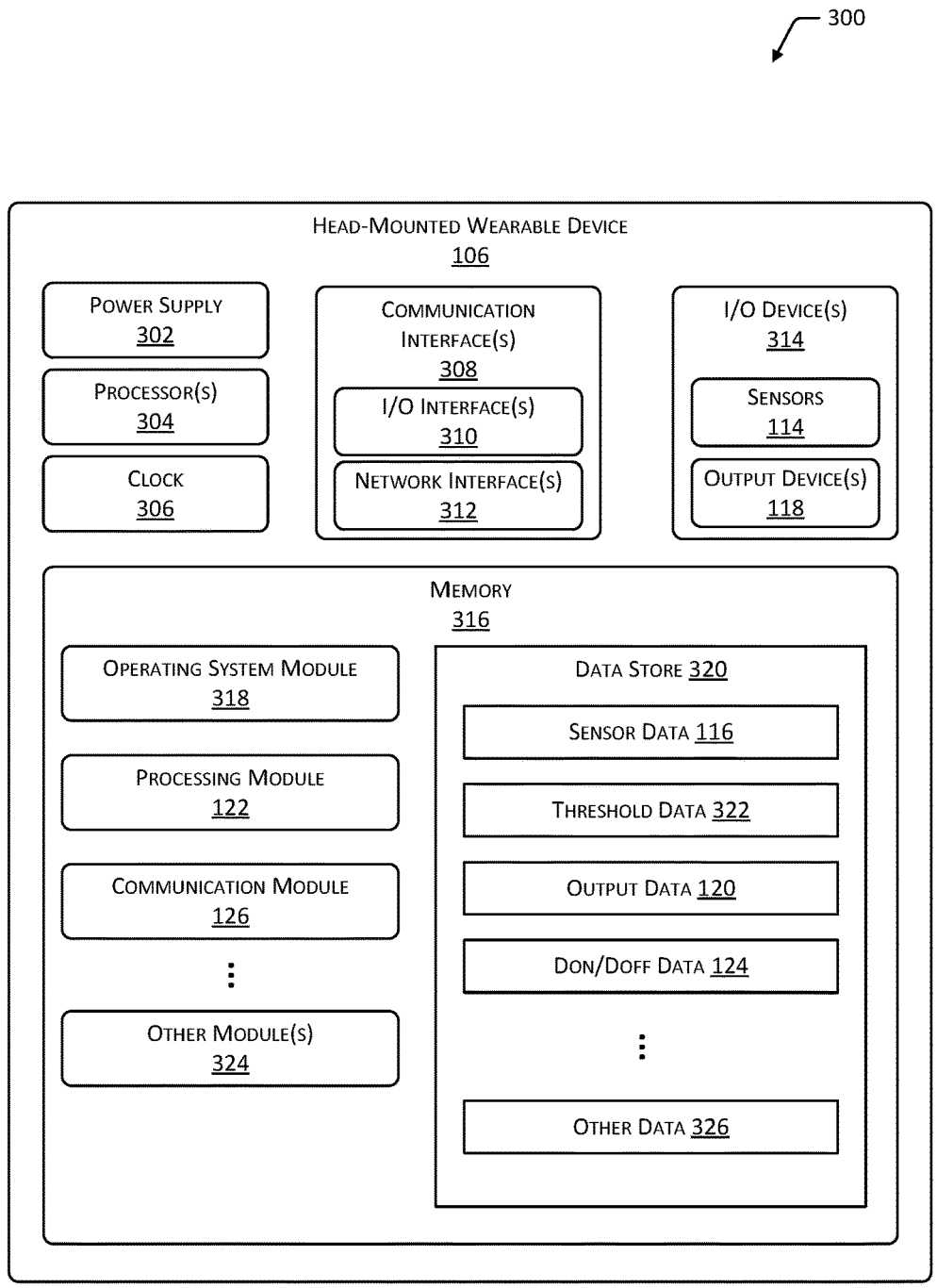
FIG. 3 is a block diagram of electronic components of the head-mounted wearable device, according to some implementations.

FIG. 3 is a block diagram of components of the HMWD 106, according to some implementations.

One or more power supplies 302 may be configured to provide electrical power suitable for operating the components in the HMWD 106. The one or more power supplies 302 may comprise batteries, capacitors, fuel cells, photovoltaic cells, wireless power receivers, conductive couplings suitable for attachment to an external power source such as provided by an electric utility, and so forth. For example, the batteries on board the HMWD 106 may be charged wirelessly, such as through inductive power transfer. In another implementation, electrical contacts may be used to recharge the HMWD 106.

The HMWD 106 may include one or more hardware processors 304 (processors) configured to execute one or more stored instructions. The processors 304 may comprise one or more cores. The processors 304 may include general purpose microprocessors, microcontrollers, application specific integrated circuits (ASICs), digital signal processors (DSPs), and so forth. One or more clocks 306 may provide information indicative of date, time, ticks, and so forth. For example, the processor 304 may use data from the clock 306 to associate a particular interaction with a particular point in time.

The HMWD 106 may include one or more communication interfaces 308 such as input/output (I/O) interfaces 310, network interfaces 312, and so forth. The communication interfaces 308 enable the HMWD 106, or components thereof, to communicate with other devices or components. The communication interfaces 308 may include one or more I/O interfaces 310. The I/O interfaces 310 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include the sensors 114. The I/O devices 314 may also include the output devices 118. In some embodiments, the I/O devices 314 may be physically incorporated with the HMWD 106 or may be externally placed. The output devices 118 are configured to generate signals, which may be perceived by the user 102 or may be detected by sensors.

The network interfaces 312 may be configured to provide communications between the HMWD 106 and other devices, such as the server 130. The network interfaces 312 may include devices configured to couple to personal area networks (PANs), wired or wireless local area networks (LANs), wide area networks (WANs), and so forth. For example, the network interfaces 312 may include devices compatible with Ethernet, Wi-Fi, Bluetooth, Bluetooth Low Energy, ZigBee, and so forth.

The HMWD 106 may also include one or more busses or other internal communications hardware or software that allow for the transfer of data between the various modules and components of the HMWD 106.

As shown in FIG. 3, the HMWD 106 includes one or more memories 316. The memory 316 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 316 provides storage of computer-readable instructions, data structures, program modules, and other data for the operation of the HMWD 106. A few example functional modules are shown stored in the memory 316, although the same functionality may alternatively be implemented in hardware, firmware, or as a system on a chip (SoC).

The memory 316 may include at least one operating system (OS) module 318. The OS module 318 is configured to manage hardware resource devices such as the I/O interfaces 310, the I/O devices 314, the communication interfaces 308, and provide various services to applications or modules executing on the processors 304. The OS module 318 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Wash., USA; and so forth.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including servers 130, network attached storage devices, and so forth.

The communication module 126 may be configured to establish communications with one or more of the computing devices 108, other HMWDs 106, servers 130, sensors 114, or other devices. The communications may be authenticated, encrypted, and so forth.

The processing module 122 may use the sensor data 116 to determine the don/doff data 124. The processing module 122 may implement one or more of the techniques described below with regard to FIGS. 6-14 to determine the don/doff data 124.

During operation of the system the data store 320 may store the sensor data 116, threshold data 322, the output data 120, the don/doff data 124, and so forth, at least temporarily, in the data store 320. The threshold data 322 comprises information specifying one or more of the thresholds described herein. For example, threshold data 322 may indicate a threshold minimum amount of force detected by the FSR sensor 202 and a threshold minimum duration of time that that force is to remain detected in order to generate don/doff data 124.

Techniques such as artificial neural networks (ANN), active appearance models (AAM), active shape models (ASM), principal component analysis (PCA), classifiers, cascade classifiers, and so forth, may also be used to process data. For example, the ANN may be trained using a supervised learning algorithm using BC mic data 216 and other information indicative of the don/doff condition. Once trained, the ANN may be provided with sensor data 116 such as BC mic data 216 and provide as output the don/doff data 124. In another implementation, the classifier may be trained and then subsequently used to determine the don/doff data 124.

Other modules 324 may also be present in the memory 316 as well as other data 326 in the data store 320. For example, the other modules 324 may include a contact management module while the other data 326 may include address information associated with a particular contact, such as an email address, telephone number, network address, uniform resource locator, and so forth.

Figure 4:
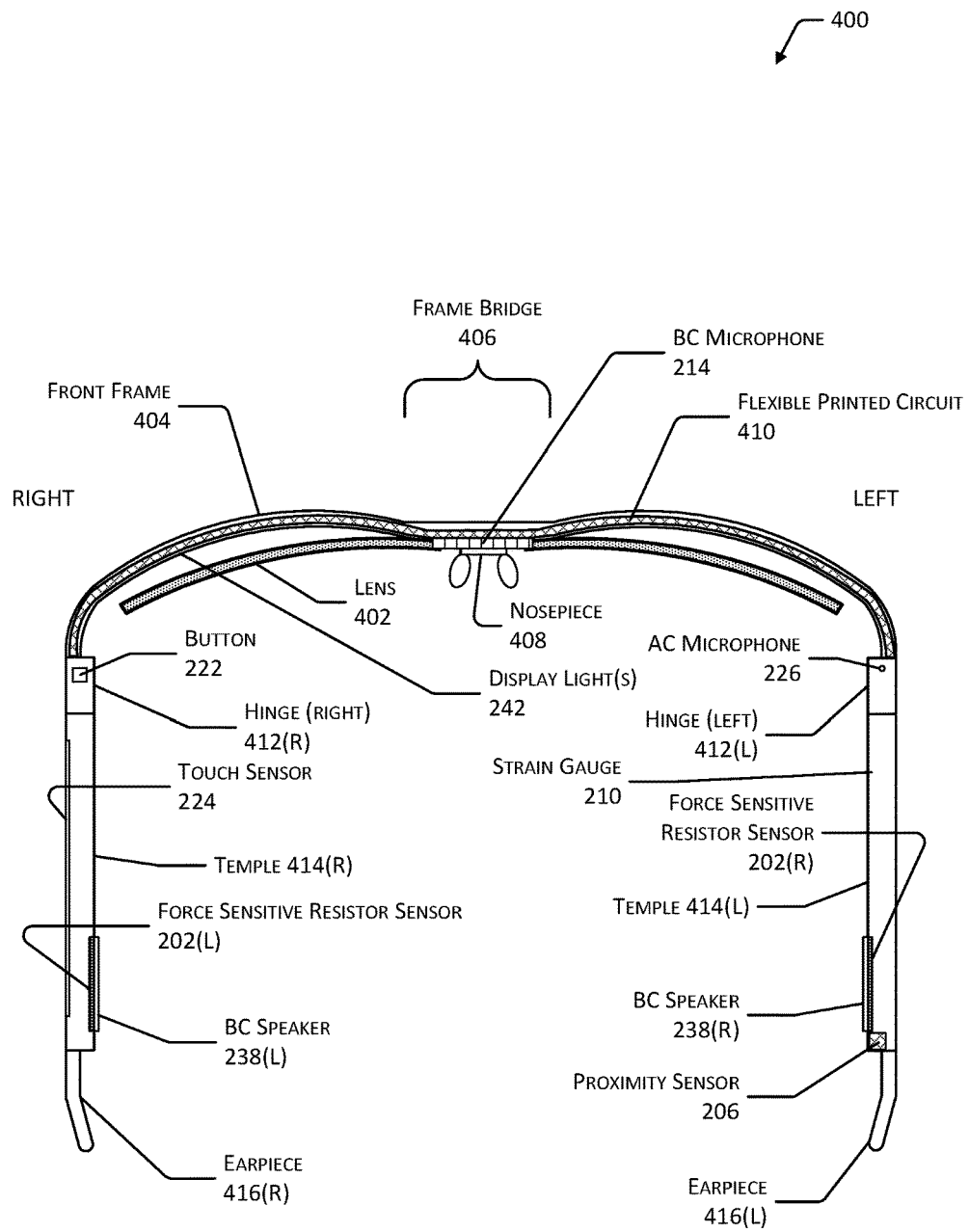
FIG. 4 depicts an exterior view, from below, of the head-mounted wearable device in an unfolded configuration, according to some implementations.

FIG. 4 depicts an exterior view 500, from below, of the HMWD 106 in an unfolded configuration, according to some implementations.

Visible in this view are the lenses 402 of a lens assembly. Because the lens assembly is affixed to a front frame 404 at a frame bridge 406, the front frame 404 may flex without affecting the positioning of the lenses 402 with respect to the eyes of the user 102. For example, when the head 104 of the user 102 is relatively large, the front frame 404 may flex away from the user's head 104 to accommodate the increased distance between the temples of the HMWD 106. Similarly, when the head 104 of the user 102 is relatively small, the front frame 404 may flex towards the user's head 104 to accommodate the decreased distance between the temples of the HMWD 106.

A nosepiece 408 is connected to the frame bridge 406. The nosepiece 408 supports the front frame 404 above the nose of the user 102. In some implementations, the BC microphone 214 may be coupled to the nosepiece 408, such that vibrations from the nose of the user 102 are detected by the BC microphone 214.

A flexible printed circuit (FPC) 410 may provide connectivity between the electronics in one or more of the front frame 404 or temples 414. For example, the left temple 414(L) may include electronics such as a hardware processor while the right temple 414(R) may include electronics such as a battery. Each temple 414 may include a housing within which the electronics are contained. The FPC 410 provides a pathway for control signals from the hardware processor to the battery, may transfer electrical power from the battery to the hardware processor, and so forth. The FPC 410 may provide additional functions such as providing connectivity to the BC microphone 214, the AC microphone 226, the button 222, components within the front frame 404, and so forth. For example, a front facing camera may be mounted within the frame bridge 406 and may be connected to the FPC 410 to provide image data to the hardware processor in the temple 414. In some implementations, the FPC 410 may be arranged within a channel on the underside of the front frame 404 and maintained within the channel by an overmolding. In other implementations, the AC microphone 226 may be located in the frame bridge 406 or the front frame 404.

One or more hinges 412 may be affixed to, or an integral part of, the front frame 404. Depicted are a left hinge 412(L) and a right hinge 412(R) on the left and right sides of the front frame 404, respectively. The left hinge 412(L) is arranged at the left brow section, distal to the frame bridge 406. The right hinge 412(R) is arranged at the right brow section, distal to the frame bridge 406.

A temple 414 may couple to a portion of the hinge 412. For example, the temple 414 may comprise one or more components, such as a knuckle, that mechanically engage one or more corresponding structures on the hinge 412.

The left temple 414(L) is attached to the left hinge 412(L) of the front frame 404. The right temple 414(R) is attached to the right hinge 412(R) of the front frame 404.

The hinge 412 permits rotation of the temple 414 with respect to the hinge 412 about an axis of rotation. The hinge 412 may be configured to provide a desired angle of rotation. For example, the hinge 412 may allow for a rotation of between 0 and 120 degrees. As a result of this rotation, the HMWD 106 may be placed into a folded configuration (not shown). For example, each of the hinges 412 may rotate by about 90 degrees, to assume the folded configuration. In some implementations, a switch or other sensor may be used to determine if the hinge has been rotated into the unfolded or folded configuration.

An earpiece 416 may be positioned at a distal end of the temple 414. In some implementations, the earpiece 416 may be shaped to extend at least partially around a back of an ear of the user 102. During normal wear of the HMWD 106, at least a portion of one or more of the temple 414 or the earpiece 416 be in contact with at least a portion of the head 104.

One or more of the front frame 404, the hinge 412, or the temple 414 may be configured to dampen the transfer of vibrations between the front frame 404 and the temples 414. For example, the hinge 412 may incorporate vibration dampening structures or materials to attenuate the propagation of vibrations between the front frame 404 and the temples 414. These vibration dampening structures may include elastomeric materials, springs, and so forth. In another example, the portion of the temple 414 that connects to the hinge 412 may comprise an elastomeric material.

One or more different sensors 114 may be placed on the HMWD 106. For example, the BC microphone 214 may be located at the frame bridge 406 while the AC microphone 226 may be placed within or proximate to the left hinge 412(L), such as on the underside of the left hinge 412(L). In one implementation, the BC microphone 214 may detect vibrations transmitted from the nose of the user 102 via a nosepiece or nose pads to the frame bridge 406. The BC microphone 214 and the AC microphone 226 may be maintained at a fixed distance relative to one another during operation by the frame. For example, the relatively rigid frame of the HMWD 106 maintains the spacing between the BC microphone 214 and the AC microphone 226. While the BC microphone 214 is depicted proximate to the frame bridge 406, in other implementations, the BC microphone 214 may be positioned at other locations. For example, the BC microphone 214 may be located in one or both of the temples 414.

A touch sensor 224 may be located on one or more of the temples 414. For example, the touch sensor 224 may be located on exterior surface of the temple 414. One or more buttons 222 may be placed in other locations on the HMWD 106. For example, a button 222(1) may be emplaced within, or proximate to, the right hinge 412(R), such as on an underside of the left hinge 412(R).

One or more strain gauges 210 may be placed in the HMWD 106. For example, a strain gauge 210 may be mounted to a structure, such as a housing of the temple 414. The strain gauge 210 may be used to detect deflection of the structural element and generate strain data 212. In another example, a strain gauge 210 may be placed within the frame bridge 406. In yet another example, strain gauge 210 may be incorporated into the hinge 412. The processing module 122 may generate don/doff data 124 based on the strain data 212. For example, when donned 110, the strain on the strain gauge 210 may differ from when the HMWD 106 is doffed 112. By determining this difference, the don/doff data 124 may be generated.

One or more proximity sensors 206 may be placed in the HMWD 106. For example, a proximity sensor 206 may be positioned within the temple 414 proximate to the earpiece of 416.

One or more bone conduction (BC) speakers 238 may be emplaced on the temples 414. For example, as depicted here, a BC speaker 238(1) may be located on the surface of the temple 414(R) that is proximate to the head 104 of the user 102 during use. Continuing the example, as depicted here, a portion of the BC speaker 238(2) may be located on the surface of the temple 414(L) that is proximate to the head 104 of the user 102 and in contact with the head 104 during use. The BC speaker 238 may be configured to generate vibrations in the head 104 that are heard as audio output by the user 102. For example, the BC speaker 238 may emit vibrations that are mechanically transferred to the temporal bone of the head 104.

In some implementations, one or more display lights 242 may be positioned on the front frame 404 or the lens assembly such that they are within the field of view of the user 102. For example, one or more display lights 242 may be arranged on an upper edge of the front frame 404.

Earpieces 416 may extend from a portion of the temple 414 that is distal to the front frame 404. The earpiece 416 may comprise a material that may be reshaped to accommodate the anatomy of the head 104 of the user 102. For example, the earpiece 416 may comprise a thermoplastic that may be warmed to a predetermined temperature and reshaped. In another example, the earpiece 416 may comprise a wire that may be bent to fit. The wire may be encased in an elastomeric material.

Figure 5:
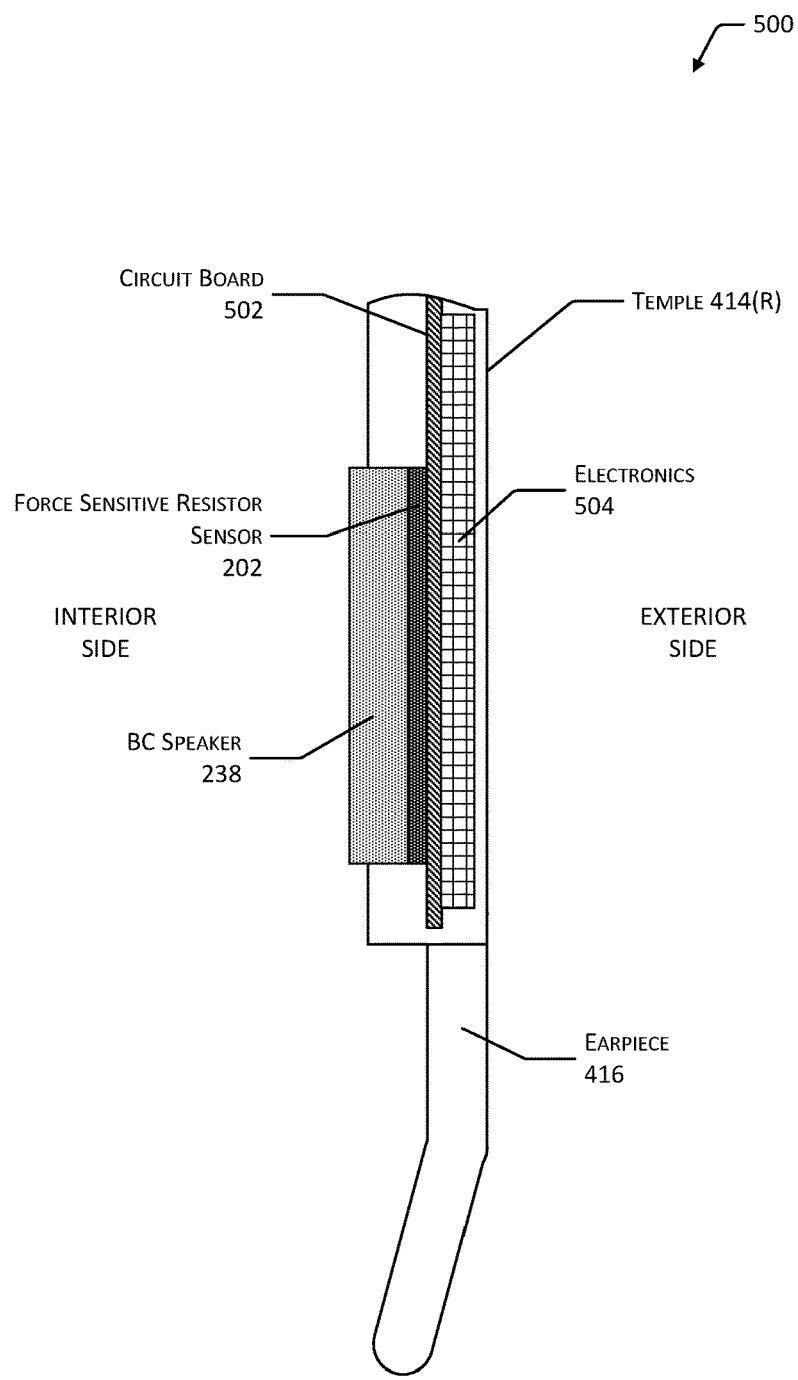
FIG. 5 depicts an enlarged cutaway view of the placement of a bone conduction (BC) speaker relative to a force sensitive resistor (FSR) sensor in a temple of the head-mounted wearable device.

FIG. 5 depicts an enlarged cutaway view 500 of the placement of a BC speaker 238 relative to a FSR sensor 202 in a temple 414 of the HMWD 106. While this cutaway depicts a right temple 414(R), similar arrangement may be found in some implementations in a left temple 414(L). A circuit board 502 is depicted. Mounted to the circuit board 502 are electronics 504 or other devices. For example, the electronics 504 may comprise the processors 304, communication interfaces 308, memory 316, and so forth. Also mounted to the circuit board 502 is an FSR sensor 202. For example, the FSR sensor 202 may be mounted using mechanical engagement features, adhesives, lamination, and so forth. Mounted atop the FSR sensor 202 is a BC speaker 238. The BC speaker 238 is this illustration is located on an interior side of the temple 414, where the interior side is the side closest to the head 104 when the HMWD 106 is donned 110.

The HMWD 106 may be configured such that in the donned 110 state, a slight contact force is applied to the head 104 by way of the BC speaker 238. For example, one or more of the front frame 404, hinges 412, temples 414, and so forth may have a slight spring or bias that produces the contact force. When donned 110, the mechanical force of the contact by the BC speaker 238 is detected by the FSR sensor 202. As described below, the FSR data 204 may be used to generate don/doff data 124.

In some situations, the particular placement of the BC speaker 238 atop the FSR sensor 202 may provide certain advantages. For example, this configuration allows for the BC speaker 238 to be directly in contact with the head 104, improving transfer of vibrations generated by the BC speaker 238 during operation. In other implementations, the FSR sensor 202 may be arranged atop the BC speaker 238.

In some implementations, the BC speaker 238 may only be mounted on one temple 414 or may be omitted entirely from the HMWD 106. In this implementation, the FSR sensor 202 may be mounted to detect the contact force. For example, the FSR sensor 202 may be mounted to the exterior of the temple 414 on an interior surface that comes into contact with the head 104 during normal wear.

Figure 6:
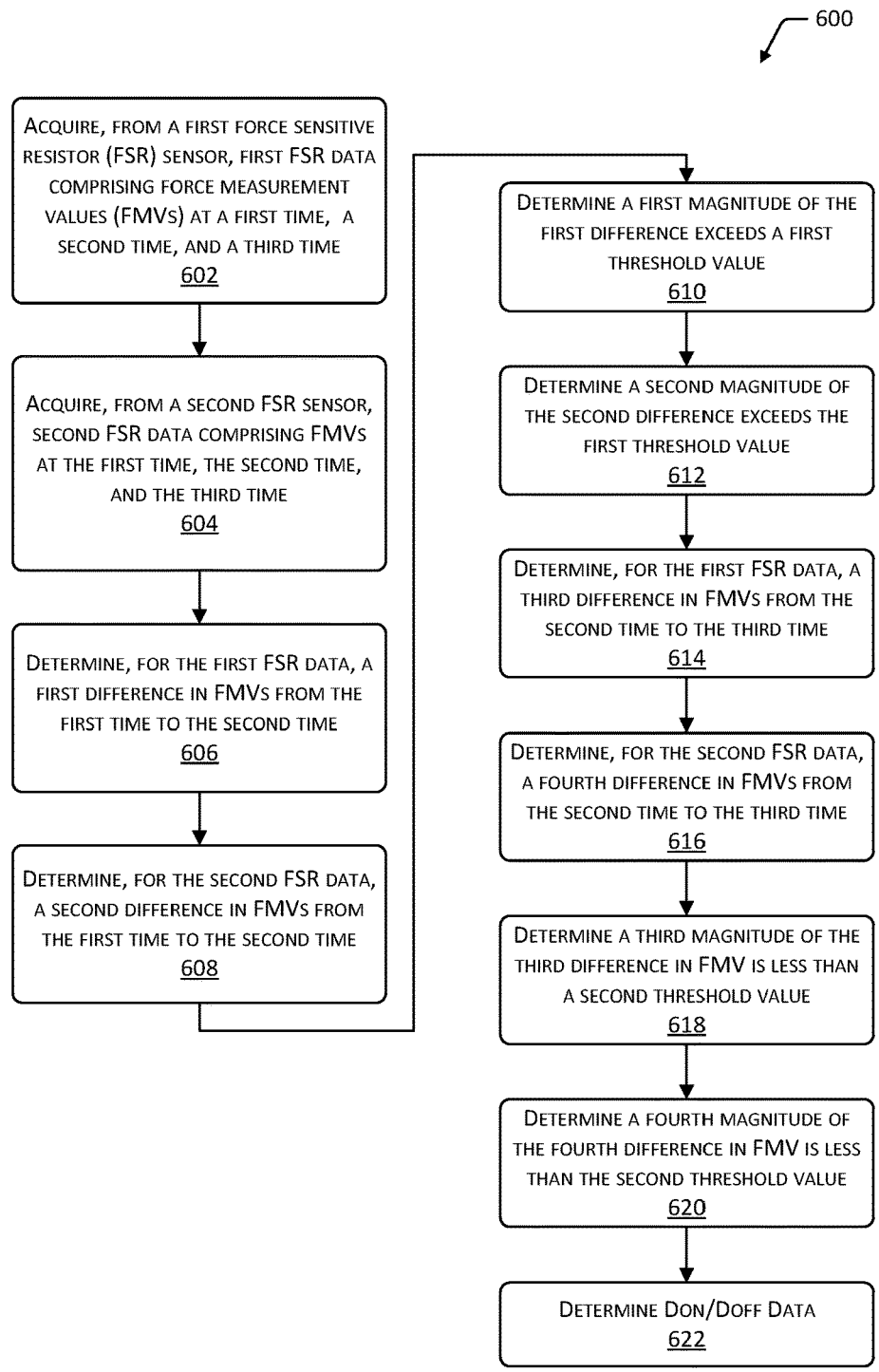
FIG. 6 depicts a flow diagram of a process for determining don/doff data using force sensitive resistor (FSR) sensors, according to some implementations.

FIG. 6 depicts a flow diagram 600 of a process for determining don/doff data 124 using FSR sensors 202, according to some implementations. The process may be implemented at least in part by one or more of the HMWD 106, the computing device 108, servers 130, or other devices. For example, the processing module 122 executing on the processor 304 may implement this process.

The processing module 122 may use the FSR data 204 to generate the don/doff data 124.

At 602, the processing module 122 may acquire first FSR data 204 from a first FSR sensor 202 (such as on the left temple 414(L)). The first FSR data 204 may comprise first force measurement values (FMVs). The first FMVs may include force measurements taken at a first time, a second time, and a third time. As described above, the FMVs are indicative of magnitude of an applied force as measured by the FSR sensor 202 at a particular time. In some implementations, the FSR data 204 may comprise a time series of force measurements taken at particular times.

At 604, processing module 122 may acquire second FSR data 204 from the second FSR sensor 202 (such as on the right temple 414(R)). The second FSR data 204 may comprise second FMVs. The second FMVs may include force measurements taken at the first time, the second time, and the third time. In another implementation, the second FMVs may be taken or otherwise acquired at times that are different from the first FMVs. In this implementation, the first and second FMVs may occur within a threshold time window of one another.

The processing module 122 may then analyze the first FMVs and the second FMVs to determine if the HMWD 106 is in the donned 110 state or the doffed 112 state. For example, if both FSR sensors 202 report an applied force that exceeds a minimum threshold force for a designated period of time, the processing module 122 may deem the HMWD 106 as being donned 110. In comparison, if both FSR sensors 202 report applied forces that are below the minimum threshold force, and that condition persists for the designated period of time, the processing module 122 may deem HMWD 106 as being doffed 112. The processing module 122 may then generate don/doff data 124 that is indicative of whether the HMWD 106 is donned 110 or doffed 112 at a particular time.

In some implementations, the minimum threshold force indicative of a donned 110 state may be between at least 10 g and at least 20 g of applied force. The designated period of time may be at least 300 ms, in some implementations.

Beginning with 606, FIG. 6 depicts one implementation of analysis that may be performed by the processing module 122. At 606, for the first FSR data 204, a first difference in FMVs from a first time to a second time is determined.

At 608, for the second FSR data 204, a second difference in FMVs from the first time to the second time is determined.

At 610, a first magnitude of the first difference is determined to exceed a first threshold value is determined. For example, the first threshold value may be used to specify the minimum amount of applied force that is used to designate the HMWD 106 is donned 110.

At 612, a second magnitude of the second difference is determined to exceed the first threshold value.

At 614, for the first FSR data 204, a third difference in FMVs is determined from the second time to the third time.

At 616, for the second FSR data 204, a fourth difference in FMVs is determined from the second time to the third time.

At 618, a third magnitude of the third difference in FMVs is determined to be less than a second threshold value. For example, the second threshold value may be less than the first threshold value and is used to determine if the state of wear of the HMWD 106 has been relatively constant from the second time to the third time.

At 620, a fourth magnitude of the fourth difference in FMVs is determined to be less than the second threshold value.

At 622, don/doff data 124 is generated. For example, if the first difference and the second difference are consistent with an increase in the applied force, a donned 110 state may be determined.

Figure 7:
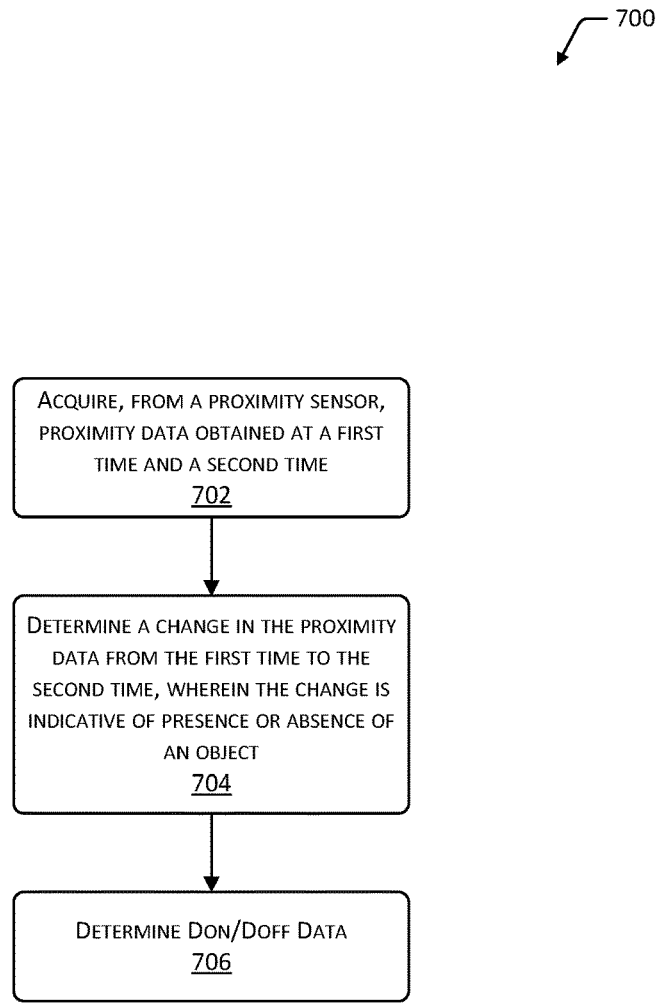
FIG. 7 depicts a flow diagram of a process for determining don/doff data using a proximity sensor, according to some implementations.

FIG. 7 depicts a flow diagram 700 of a process for determining don/doff data 124 using a proximity sensor 206, according to some implementations. The process may be implemented at least in part by one or more of the HMWD 106, the computing device 108, servers 130, or other devices. For example, the processing module 122 executing on the processor 304 may implement this process.

At 702, proximity data 208 is obtained from one or more proximity sensors 206. For example, the proximity sensors 206 may comprise a capacitive proximity sensor that is mounted within the temple 414. The proximity data 208 is obtained at a first time and a second time.

At 704, a change in the proximity data 208 from the first time the second time is determined. This change is indicative of presence or absence of an object. For example, the proximity data 208 at the first time may indicate presence of an object such as the head 104, while the proximity data 208 at the second time may indicate an absence of the object.

At 706, don/doff data 124 is determined. Continuing the example above, when the proximity data 208 first indicated presence of an object at the first time and then indicated an absence of the object at the second time, the don/doff data 124 is determined to be indicative of the HMWD 106 being doffed 112.

Figure 8:
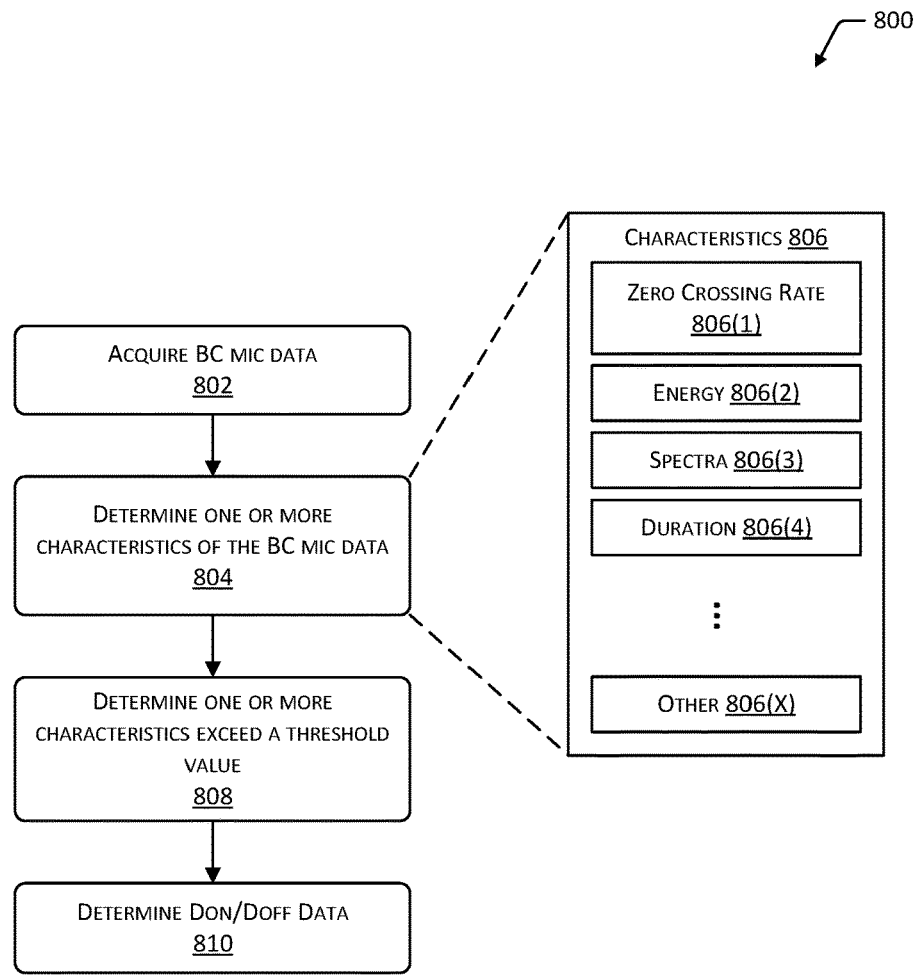
FIG. 8 depicts a flow diagram of a process for determining don/doff data using a BC microphone, according to some implementations.

FIG. 8 depicts a flow diagram 800 of a process for determining don/doff data 124 using a BC microphone 214, according to some implementations. The process may be implemented at least in part by one or more of the HMWD 106, the computing device 108, servers 130, or other devices. For example, the processing module 122 executing on the processor 304 may implement this process.

At 802, BC mic data 216 is acquired using the BC microphone 214. For example, at periodic intervals such as every 300 ms, the BC microphone 214 may be used to acquire BC mic data 216.

At 804, one or more characteristics 806 are determined for at least a portion of the BC mic data 216. These characteristics 806 may include a zero crossing rate (ZCR) 806(1), an energy 806(2) of the BC mic data 216, spectra 806(3), duration 806(4), or other characteristics 806(X).

The BC mic data 216 may comprise a single frame of pulse code modulated (PCM) or pulse density modulated (PDM) data that includes a plurality of samples, each sample representative of an analog value at the different times. In other implementations, other digital encoding schemes may be utilized. The PCM or PDM data may thus be representative of an analog waveform that is indicative of motion detected by the BC microphone 214 resulting from vibration of the head 104 of the user 102. As described above, the BC microphone 214 may comprise an accelerometer that produces time varying analog data indicative of motion along one or more axes. The ZCR provides an indication as to how often the waveform transitions from a positive to a negative value. The ZCR may be expressed as a number of times that a mathematical sign (such as positive or negative) of the signal undergoes a change from one to the other. For example, the ZCR may be calculated by dividing a count of transitions from a negative sample value to a positive sample value by a count of sample values under consideration, such as in a single frame of PCM or PDM data. The ZCR may be expressed in terms of units of time (such as number of crossings per second), may be expressed per frame (such as number of crossings per frame), and so forth. In some implementations, the ZCR may be expressed as a quantity of "positive-going" or "negative-going", instead of all crossings.

In some implementations, the BC mic data 216 (or other data) may be expressed as a value that does not include sign information. In these implementations, the ZCR may be described based on the transition of the value of the signal going above or below a threshold value. For example, the BC mic data 216 may be expressed as a 16 bit unsigned value capable of expressing 65,535 discrete values. When representing an analog waveform that experiences positive and negative changes to voltage, the zero voltage may correspond to a value at a midpoint within that range. Continuing the example, the zero voltage may be represented by a value of 37,767. As a result, digital samples of the analog waveform within the frame may be deemed to be indicative of a negative sign when they have a value less than 37,767 or may be deemed to be indicative of a positive sign when they have a value greater than or equal to 37,767.

Several different techniques may be used to calculate the ZCR. For example, for a frame comprising a given number of samples, the total number of positive zero crossings in which consecutive samples transition from negative to positive may be counted. The total number of positive zero crossings may then be divided by the number of samples to determine the ZCR for that frame.

The processing module 122 may compare the ZCR 806(1) with a threshold value. For example, when the HMWD 106 is donned 110, the ZCR 806(1) may be above the threshold value. The threshold value may be based on ZCR values deemed to be typical of human speech. In comparison, when the HMWD 106 is doffed 112, the ZCR 806(1) may be below the threshold value.

Energy of the signal may be determined. The energy 806(2) is a value indicative of the energy of at least a portion of a signal represented by the BC mic data 216. For the purposes of signal processing and assessment as described herein, the energy of a signal and the power of a signal are not necessarily actual measures of physical energy and power, such as involved in moving the BC microphone 214. However, there may be a relationship between the physical energy in the system and the energy of the signal as calculated.

The energy 806(2) of a signal may be calculated in several ways. For example, the energy of the signal may be determined as the sum of the area under a curve that the waveform describes. In another example, the energy of the signal may be a sum of the square of values for each sample divided by the number of samples per frame. This results in an average energy of the signal per sample. The energy may be indicative of an average energy of the signal for an entire frame, a moving average across several frames of BC mic data 216, and so forth. The energy may be determined for a particular frequency band, group of frequency bands, and so forth.

In one implementation, other characteristics of the signal may be determined instead of the energy. For example, an absolute value may be determined for each sample value in a frame. These absolute values for the entire frame may be summed, and the sum divided by the number of samples in the frame to generate an average value. This average value may be used instead of or in addition to the energy. In another implementation, a peak sample value may be determined for the samples in a frame. The peak value may be used instead of or in addition to the energy.

The processing module 122 may compare the energy 806(2) with a threshold value. For example, if the HMWD 106 is donned 110, the energy 806(2) may be below the threshold value. The threshold value for energy may be determined based on that which is expected for human speech. In comparison, when the HMWD 106 is doffed 112, the energy 806(2) may be above the threshold value. When worn, the head 104 of the user 102 acts as an attenuator, dampening vibrations that are detected by the BC microphone 214. As a result, when doffed 112 the energy 806(2) detected is greater than when donned. In some implementations other assessments may be used. For example, a voice activity detector may be used to determine when the user 102 is not speaking. The energy 806(2) of the BC mic data 216 obtained during periods when the user 102 is not speaking may be used to determine the don/doff data 124.

The spectra 806(3) may comprise information about the spectra in the time domain or frequency domain of the BC mic data 216. For example, the spectra 806(3) may comprise spectra indicative of energy 806(2) with respect to time or frequency. The processing module 122 may compare recently acquired spectra 806(3) with previously defined spectra 806(3) or spectral characteristics to determine if the HMWD 106 is donned 110 or doffed 112. For example, particular spectra 806(3) may be associated with the donned 110 state, while other spectra 806(3) are associated with the doffed 112 state. In another example, the processing module 122 may determine that previously defined spectral peaks are present in the recently acquired spectra 806(3), and based on that determine the don/doff data 124.

In some implementations, the BC mic data 216 may be processed using one or more machine learning techniques or algorithms. For example, the BC mic data 216 may be processed using a classifier to determine the BC mic data 216 is either indicative of a donned 110 state or the doffed 112 state. The classifier may be trained using BC mic data 216 and input from other sensors, user input, the characteristics 806, and so forth. For example, the classifier may be trained for a particular user 102 by using input from another sensor or set of sensors such as the FSR sensor 202, proximity sensor 206, and so forth. The classifier may also be trained to user input. For example, the user 102 may press the button 222, swipe the touch sensor 224, or provide other input that is indicative of whether the HMWD 106 is donned 110 or doffed 112. The classifier may then be trained using this input and the BC mic data 216 to subsequently provide automated results.

Instead of or in addition to the use of the classifier, other techniques such as artificial neural networks (ANNs), support vector machine, Bayesian networks, Markov networks, and so forth.

In some implementations, the characteristics 806 may include the duration 806(4) of one or more of the other characteristics. For example, the ZCR 806(1) may be specified for a particular duration 806(4), the energy 806(2) may be specified for a particular duration 806(4), and so forth.

One or more characteristics 806 may be compared to respective threshold values. For example, the ZCR 806(1) for at least a portion of a frame of BC mic data 216 may be compared to a threshold ZCR value, the energy 806(2) may be compared to a threshold energy value, the duration 806(4) length of the characteristic(s) 806 being above the respective threshold may be assessed, and so forth.

Other characteristics 806(X) of the BC mic data 216 may be determined and subsequently used to determine the don/doff data 124. For example the other characteristics 806(X) may include a phase angle, range indicating a difference between the maximum and minimum values in a given time window such as a frame, bitrate, and so forth. For example, the BC microphone 214 or other devices that process the output from the BC microphone 214 may generate BC mic data 216 having a variable bit rate.

One or more the thresholds described may be stored as the threshold data 322 described above.

At 810 don/doff data 124 is determined. As mentioned above, this determination may be based on one or more of the characteristics 806.

Figure 9:
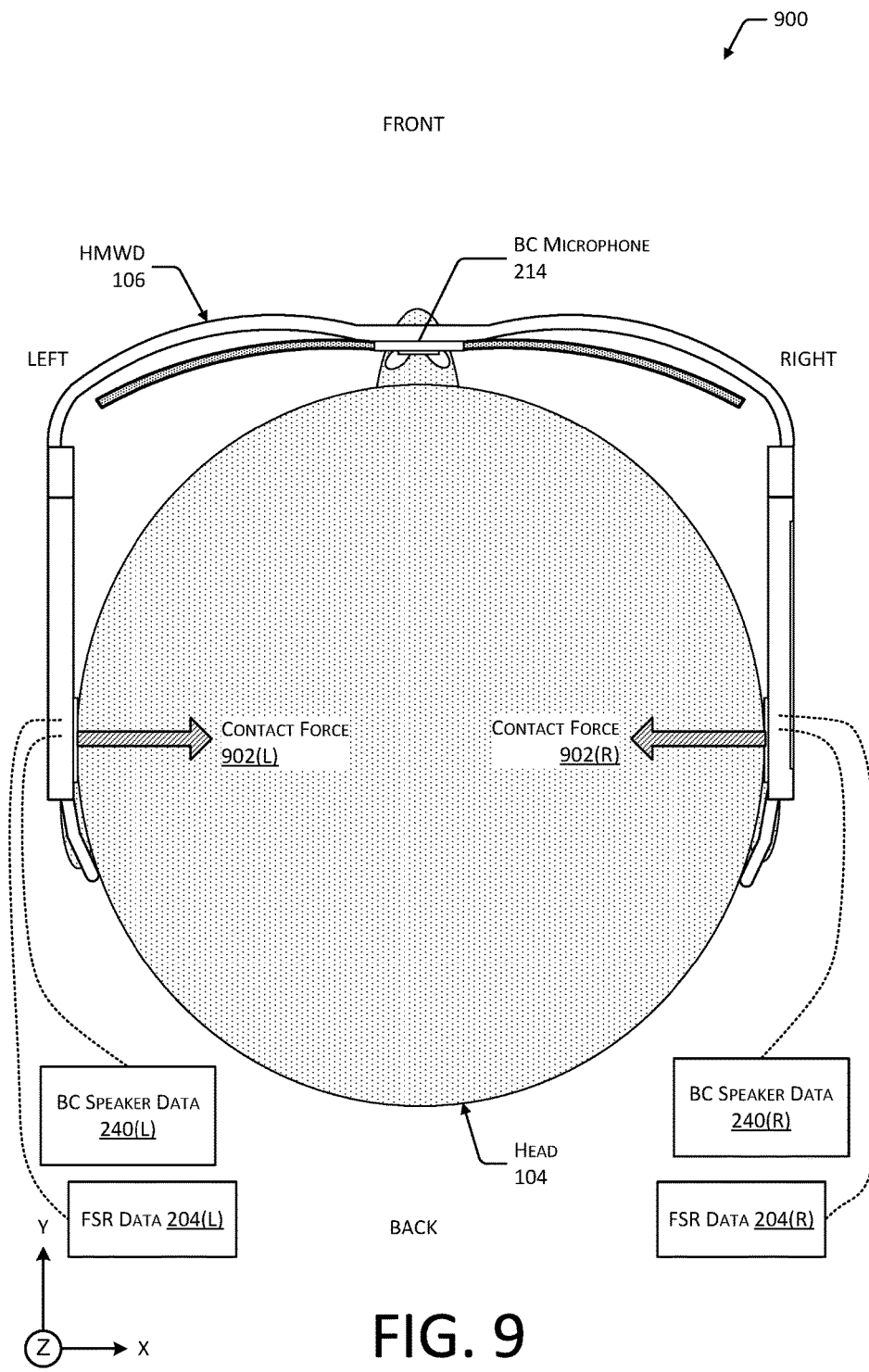
FIG. 9 depicts an overhead view of the head-mounted wearable device being worn by a user, according to some implementations.

FIG. 9 depicts an overhead view 900 of the HMWD 106 being worn by a user 102, according to some implementations. This illustration depicts the contact force 902 that is exerted by the HMWD 106 on the head 104 of the user. The contact force 902 is directed generally from the ears of the user 102 towards the middle of the head 104.

As discussed above, the contact force 902 may be detected and characterized by one or more of the FSR sensors 202 to produce the FSR data 204 shown here.

In some implementations, other sensors may be used to determine mechanical forces resulting from don 110 or doff 112 of the HMWD 106. For example, one or more strain gauges 210 may be affixed to the earpieces 416 to determine if they are displaced by the user's head 104.

As also described above, in some implementations, the BC speaker 238 may be used to generate BC speaker data 240 shown here. This BC speaker data 240 may be used as described next to determine don/doff data 124.

Figure 10:
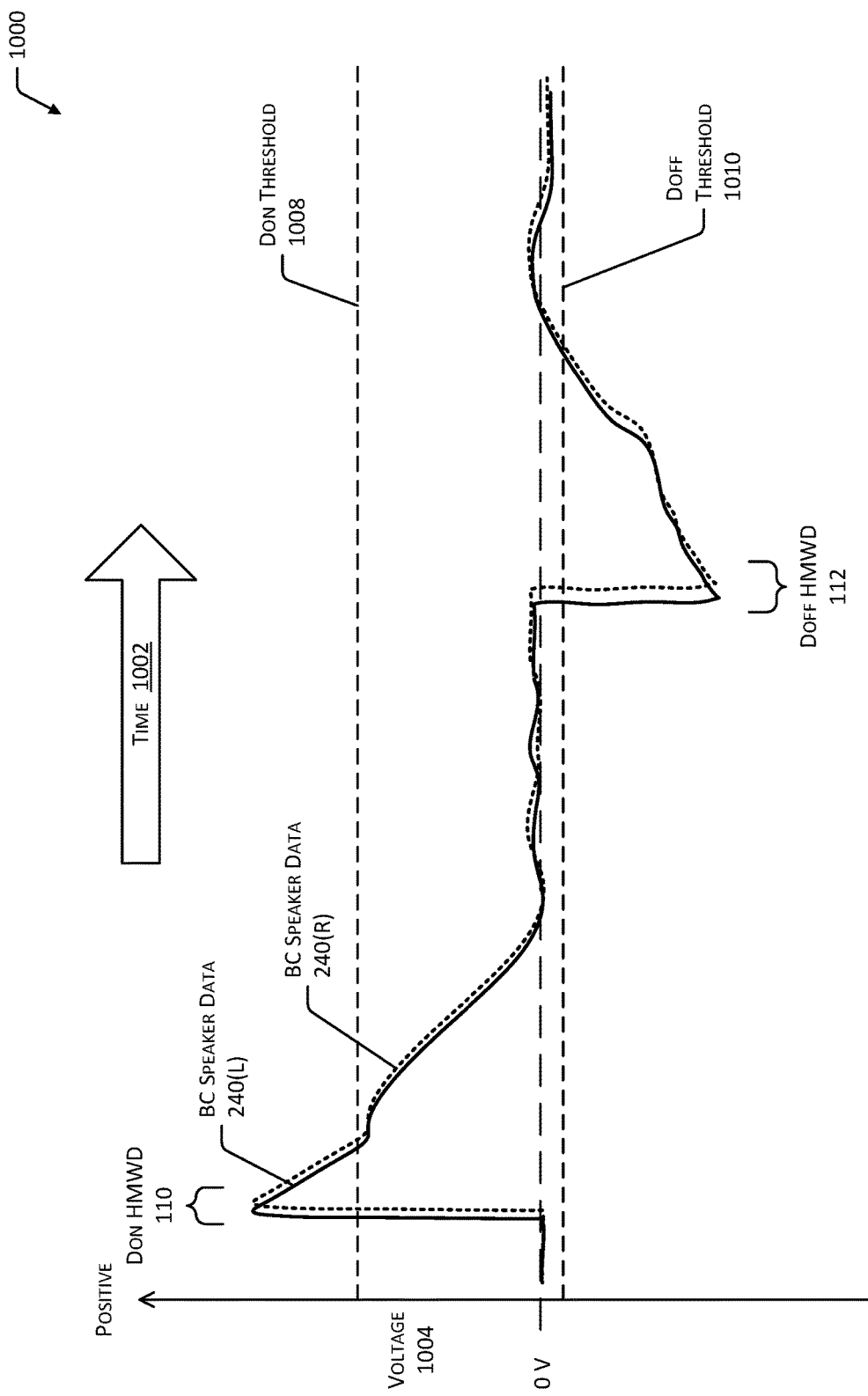
FIG. 10 depicts a graph of voltage indicated by BC speaker output from a piezoelectric BC speaker during don and doff, according to some implementations.

FIG. 10 depicts a graph 1000 of voltage indicated by BC speaker output from a piezoelectric BC speaker 238 during don 110 and doff 112, according to some implementations.

In this graph, time 1002 increases along a horizontal axis from left to right while voltage 1004 is illustrated along a vertical axis extending from negative to positive.

In this illustration, the voltage 1004 for the BC speaker data 240 from the left and the right BC speakers 238 is depicted. Initially, a 0 voltage 1004 is provided by the piezoelectric element in the respective BC speakers 238. However, piezoelectric materials will generate a voltage when they experience a change in the physical shape, such as under compression or decompression due to the application of or removal of an external mechanical force.

When the user 102 dons 110 the HMWD 106, the contact force 902 between the BC speaker 238 and head 104 of the user 102 physically compresses the piezoelectric material, generating a spike of positive voltage that then decreases over time. A don threshold 1008 specifies a minimum positive voltage that is deemed to be indicative of a don 110 event. As depicted here, the positive spike in voltage indicated by the BC speaker data 240 exceeds the don threshold 1008 and thus may be deemed to be indicative of the HMWD 106 being donned 110. In some implementations, both the left and right BC speaker data 240 may be required to exceed the don threshold 1008 within a time window of one another in order for the don 110 event to be determined.

Following the donning 110 of the HMWD 106, the positive voltage 1004 produced by the BC speakers 238 decays back towards the 0 V value. The BC speaker data 240 may indicate some fluctuation above and below the 0 V value. This may be due to noise in the system, small movements of the HMWD 106 relative to the head 104, and so forth.

While HMWD 106 remains donned 110, the piezoelectric element remains somewhat compressed due to the contact force 902. When a doff 112 event takes place, the HMWD 106 is removed from the head 104 and thus the contact force 902 is also removed. With the removal of this contact force 902, the piezoelectric material expands to its non-compressed shape. During this expansion, a spike of negative voltage 1004 is generated which then decays as the piezoelectric material returns to its noncompressed shape.

A doff threshold 1010 specifies a minimum negative voltage 1004 that is deemed to be indicative of a doff 112 event. As depicted here, the negative spike in voltage 1004 indicated by the BC speaker data 240 exceeds the doff threshold 1010 and thus may be deemed to be indicative of the HMWD 106 being doffed 112. In some implementations, both the left and right BC speaker data 240 may be required to exceed the doff threshold 1010 within a time window of one another in order for the doff 112 event to be determined.

Due to the nature of the piezoelectric material or other type of transducer mechanism, the absolute value magnitude of the don threshold 1008 and the doff threshold 1010 may differ. For example, as shown the absolute value of the don threshold 1008 with respect to the 0 voltage is greater than the absolute value of the doff threshold 1010.

The processing module 122 may analyze the BC speaker data 240 as described above to determine if there has been a don 110 event or a doff 112 event of the HMWD 106. In some implementations, other analysis of the BC speaker data 240 may be performed. For example, the rise time, decay time, and so forth of the BC speaker data 240 may be assessed and compared to one or more threshold values to determine the don/doff data 124. Continuing the example, the processing module 122 may disregard BC speaker data 240 that indicates a voltage spike that exceeds the threshold but has a slow rise time that exceeds a threshold minimum rise time value.

In some implementations, the BC speaker data 240 may be disregarded or not acquired at particular times. The acquisition of BC speaker data 240 during the use of the BC speaker 238 to emit a vibration may be prevented. For example, when the BC speaker 238 is being driven to produce vibrations, acquisition of BC speaker data 240 may be discontinued. In some implementations, a "quiet period" or "relaxation period" may be specified before acquisition of BC speaker data 240 resumes. This period of time may allow for the transducer to revert to a desired state. For example, when the BC speaker 238 has been energized to generate a vibration, for 500 milliseconds after the BC speaker 238 has been de-energized, no BC speaker data 240 may be obtained. After the 500 ms, BC speaker data 240 may begin to be acquired. Likewise, in some implementations when the BC speaker 238 is determined to be idle, BC speaker data 240 may be acquired during this idle time.

While voltage is described, it is understood in other implementations, other electrical characteristics may be assessed. For example, current flow, capacitance, inductance, and so forth may be assessed to determine changes to the BC speaker 238 that are indicative of a don 110 or doff 112 of the HMWD 106.

Figure 11:
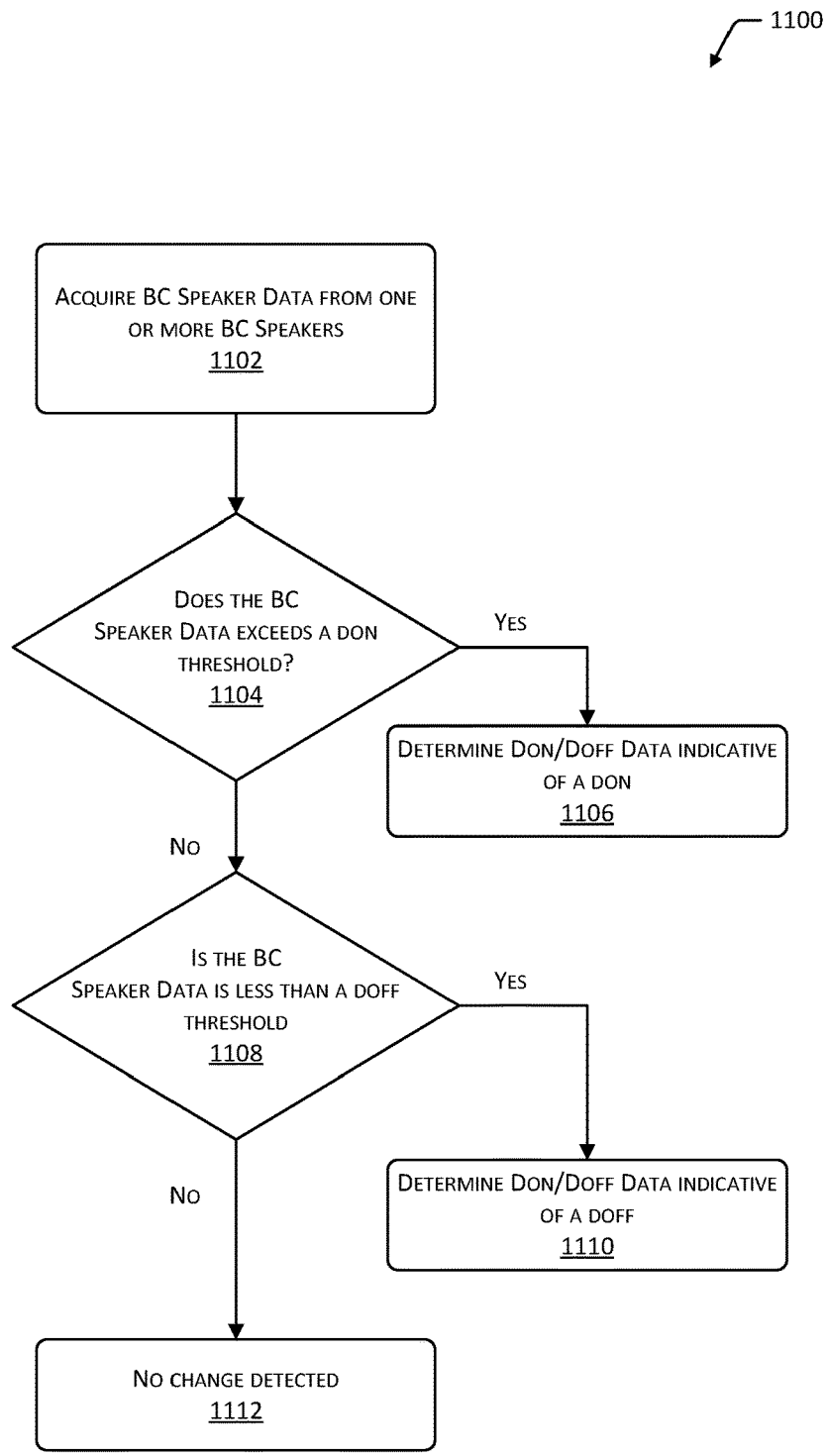
FIG. 11 depicts a flow diagram of a process for determining don/doff data using output from a piezoelectric BC speaker, according to some implementations.

FIG. 11 depicts a flow diagram 1100 of a process for determining don/doff data 124 using output from a piezoelectric BC speaker 238, according to some implementations. The process may be implemented at least in part by one or more of the HMWD 106, the computing device 108, servers 130, or other devices. For example, the processing module 122 executing on the processor 304 may implement this process.

At 1102, BC speaker data 240 is acquired from one or more BC speakers 238. As described above, the BC speaker data 240 is indicative of a time-varying voltage that may be produced by a piezoelectric element.

The process determines the BC speaker data 240 exceeded one or more of a first threshold value or a second threshold value, wherein the first threshold value is indicative of a positive voltage and the second threshold value is indicative of a negative voltage. In the implementation depicted and described next, several comparisons between the BC speaker data 240 and one or more thresholds may be performed.

At 1104, the BC speaker data 240 is analyzed to determine if a don threshold 1008 has been exceeded. If the BC speaker data 240 is indicative of the don threshold 1008 being exceeded, the process proceeds to 1106. At 1106 don/doff data 124 indicative of a don 110 is generated. If the BC speaker data 240 does not exceed the don threshold 1008, the process may proceed to 1108.

At 1108, the BC speaker data 240 is analyzed to determine if a doff threshold 1010 has been exceeded. If the BC speaker data 240 is indicative of the doff threshold 1010 being exceeded, the process proceeds to 1110. At 1110, don/doff data 124 indicative of a doff 112 is generated. If the BC speaker data 240 does not exceed the doff threshold 1010, the process proceeds to 1112. At 1112, no change is detected. In some implementations, following the no change detection, previously determined don/doff data 124 may be determined and provided again to other modules.

The BC speaker data 240 is indicative of changes in the pressure applied to the BC speaker 238. After the BC speaker 238 reaches a steady state, such as at some time after pressure is applied or released, no time-varying voltage may be produced. As a result, the processing module 122 is able to use the BC speaker data 240 to detect a change in state between don 110 and doff 112.

In one implementation, the BC speaker data 240 for the left and right BC speakers 238 may be stored in respective first-in-first-out (FIFO) buffers. When the values of the BC speaker data 240 are above a threshold value in both buffers, the processing module 122 may generate don/doff data 124 indicative of a change.

In some implementations, a magnitude of the don threshold 1008 may be greater than a magnitude of the doff threshold 1010, or vice versa.

Figure 12:
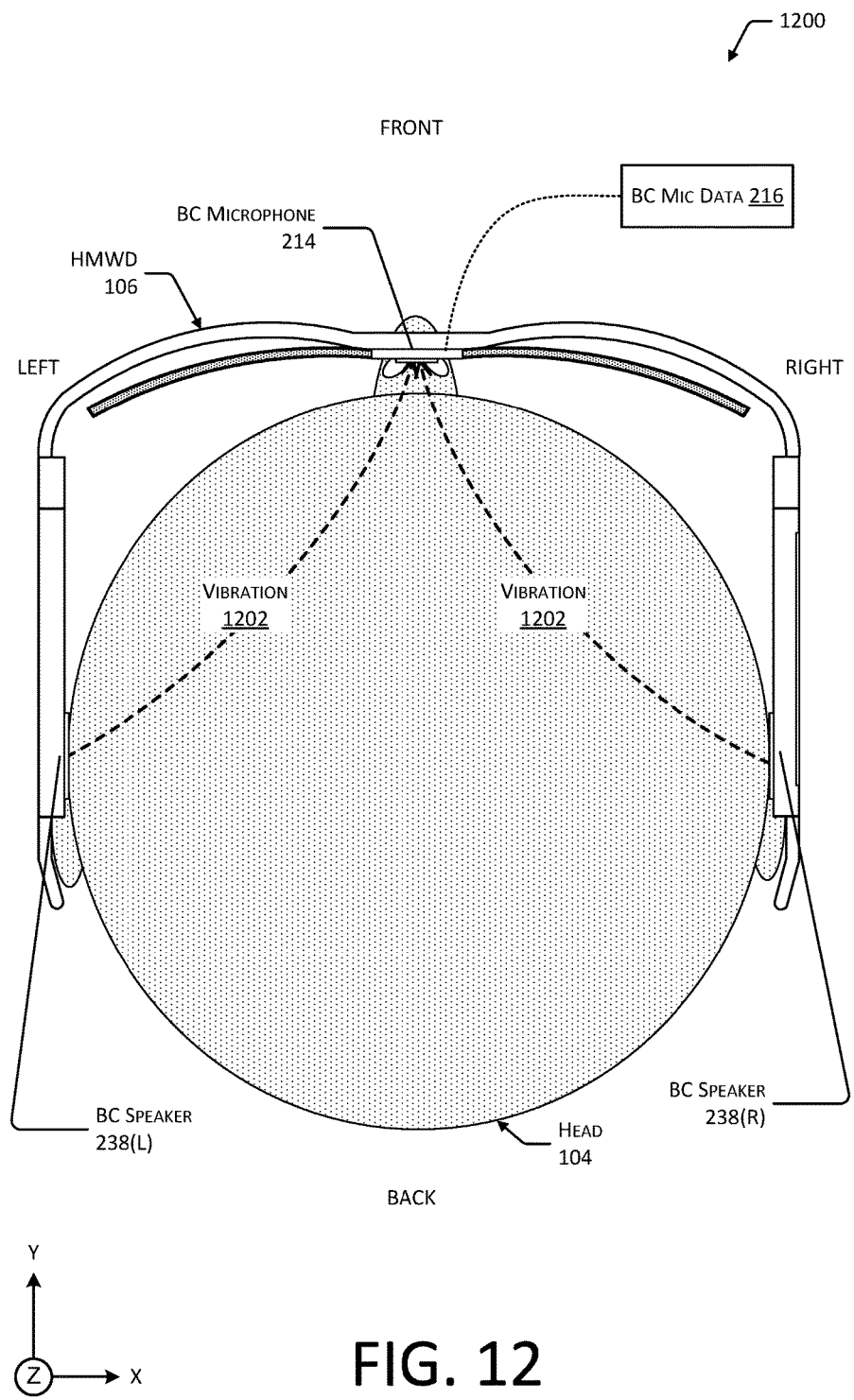
FIG. 12 depicts an overhead view of the head-mounted wearable device being worn by a user when a vibration is emitted by the BC speaker and detected by the BC microphone, according to some implementations.

FIG. 12 depicts an overhead view 1200 of the HMWD 106 being worn by a user 102 when a vibration is emitted by the BC speaker 240 and detected by the BC microphone 214, according to some implementations.

Don/doff data 124 may be determined based at least in part on the BC mic data 216 that is indicative of a vibration 1202 produced by one or more of the BC speakers 238. The vibration 1202 may comprise longitudinal waves of successive compression and rarefaction of a medium. The BC speakers 238 impart a mechanical force that moves at least a portion of the medium that is in contact with the BC speaker 238. For example, while donned 110, the BC speaker 238 imparts a mechanical motion on a portion of the head 104. Continuing the example, while doffed 112, the BC speaker 238 imparts a mechanical motion on the air adjacent to the BC speaker 238.

Depending on whether the HMWD 106 is donned 110 or doffed 112, the received signal strength of the vibration 1202 at the BC microphone 214 as indicated by the BC mic data 216 will differ. For example, the user's head 104 provides an effective medium for relatively efficient transfer of vibration 1202, particularly relative to air. As a result, when the HMWD 106 is donned 110, the vibrations 1202 conducted by the head 104 are received by the BC microphone 214 at a greater amplitude than vibrations 1202 transferred by ambient air. By comparing the amplitude of the vibrations 1202 as indicated by BC mic data 216, the don/doff data 124 may be determined. One or more filters may be applied to the BC mic data 216 to facilitate assessment of the vibration 1202 as generated by the one or more BC speakers 238. For example, a digital signal processing (DSP) or analog band pass filter may be used to pass a particular band of frequencies of interest while attenuating those outside of the band.

In one implementation, the vibration 1202 may be generated by the BC speaker 238 for the determination of the don/doff data 124. For example, either on-demand or at periodic intervals a vibration 1202 comprising a sine wave tone with a frequency of between 70 Hertz and 500 Hertz may be emitted. These relatively low frequencies may be minimally perceptible to the user 102. For example, the human ear may perceive low frequency vibrations and high frequency vibrations as having different loudness, even when they exhibit the same level of sound pressure. By taking advantage of this fact, the vibrations 1202 may utilize frequencies such as those below 500 Hz that provide sufficient energy for detection by the BC microphone 214 but are below the threshold for perception by the user 102.

In other implementations, other frequencies may be used. For example, the vibration 1202 may be at ultrasonic frequencies, such as greater than or equal to 20,000 Hz.

The vibrations 1202 may be emitted with one or more wave forms. For example, the vibrations 1202 may comprise sinusoidal or sine wave forms. In other implementations, different wave forms or frequencies may be used. For example, a square wave form, triangle wave form, or sawtooth wave form may be used.

In another implementation, the vibration 1202 may be generated responsive to other audio data, such as playback of an audio file, notification sounds, voice sounds associated with a telephone call, and so forth. The vibration 1202 may be the output by the BC speaker 238 with the primary intention being presentation of the audio to the user 102. However, the BC mic data 216 may be assessed to determine the presence of waveforms corresponding to the vibrations 1202 that are output by the BC speaker 238. For example, the cross-correlation may be performed between output data 120 that is being transferred to the BC speaker 238 for output and the BC mic data 216 obtained at the same time as the generation of the vibrations 1202. By performing this cross-correlation, or other techniques to determine if at least a portion of the output data 120 and the BC mic data 216 are similar, the output data 120 and its corresponding vibrations 1202 may be used as described to determine the don/doff data 124. Once the similarities been determined, the amplitude of that similar signal as indicated by the BC mic data 216 may then be assessed with respect to the threshold.

Different heads 104 affect the transmission of the vibrations 1202 differently, allowing for identification of a particular user 102. The vibration 1202 may be used to identify the user 102. The vibration 1202 may be emitted at one or more frequencies. The values of the BC mic data 216 may be compared with the output data 120 to determine propagation characteristics of the head 104. For example, these propagation characteristics may include attenuation for particular frequencies, phase changes, time of arrival, and so forth. Propagation characteristics may be stored and associated with a particular user identity, and may later be used for comparison. By comparing current propagation characteristics of the head 104 with previously stored propagation characteristics of the head 104, the particular user identity may be determined. The comparison may utilize machine learning techniques, statistical techniques, comparison of one or more thresholds, and so forth. For example, a classifier may be trained to recognize the propagation characteristics of a particular user.

Figure 13:
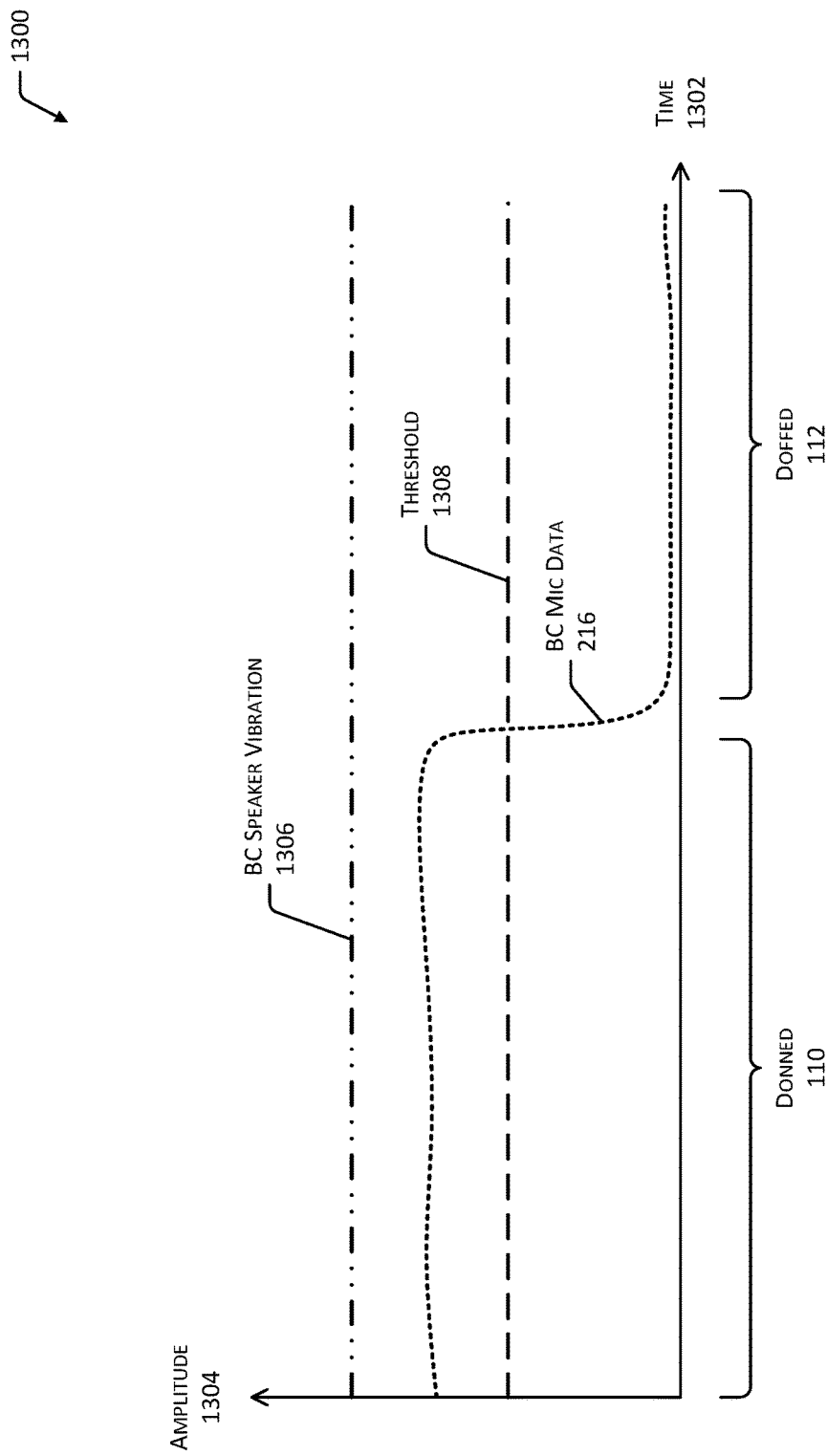
FIG. 13 depicts a graph of signal amplitude indicated by BC mic data obtained while the BC speaker is emitting a vibration, according to some implementations.

FIG. 13 depicts a graph 1300 of signal amplitude indicated by BC mic data 216 obtained while the BC speaker 238 is emitting a vibration, according to some implementations.

In this graph, time 1302 increases from left to right along a horizontal axis. Amplitude 1304 is indicated along a vertical axis. Depicted is the BC mic data 216 and a BC speaker vibration 1306. In this illustration, the BC speaker vibration 1306 is depicted as being constant with respect to time. However, it is understood that the BC speaker vibration 1306 may be time varying. For example, the BC speaker vibration 1306 may be present at some times and absent at others. The BC mic data 216 indicates an amplitude over time of the BC speaker vibration 1306 as detected by the BC microphone 214. A threshold 1308 is depicted. If the BC mic data 216 indicates amplitude values that exceed the threshold 1308, the processing module 122 may generate don/doff data 124 that is indicative of the HMWD 106 being donned 110. This is because the head 104 of the user 102 provides a more effective medium for transmission of the vibrations 1202 than the air. If the BC mic data 216 indicates amplitude values that are less than threshold 1308, the processing module 122 may generate don/doff data 124 that is indicative of the HMWD 106 being doffed 112.

In some implementations, the processing module 122 may use a series of measurements of the amplitude of the BC mic data 216 over time to determine the don/doff data 124. For example, every 100 ms the BC speaker 238 may generate a ping vibration 1202 and the BC mic data 216 for these times may be assessed. If two or more successive pings are received and indicated in the BC mic data 216 as having amplitudes that exceed the threshold 1308, the don/doff data 124 may be generated that indicates the HMWD 106 is donned 110.

In another implementation, the processing module 122 may determine if amplitude values of the BC mic data 216 have remained above or below the threshold 1308 for a minimum period of time as part of the determination of the don/doff data 124. For example, the processing module 122 may be configured with the threshold minimum period of time of 250 ms. In this example, the amplitude of the BC mic data 216 may need to remain above the threshold 1308 for at least 250 ms before the determination of don/doff data 124 indicative of a donned 110 state is generated.

In other implementations, other characteristics of the BC speaker vibration 1306 may be assessed. For example phase changes between the BC speaker vibration 1306 as emitted and the BC mic data 216 as obtained may be used to determine the don/doff data 124.

Figure 14:
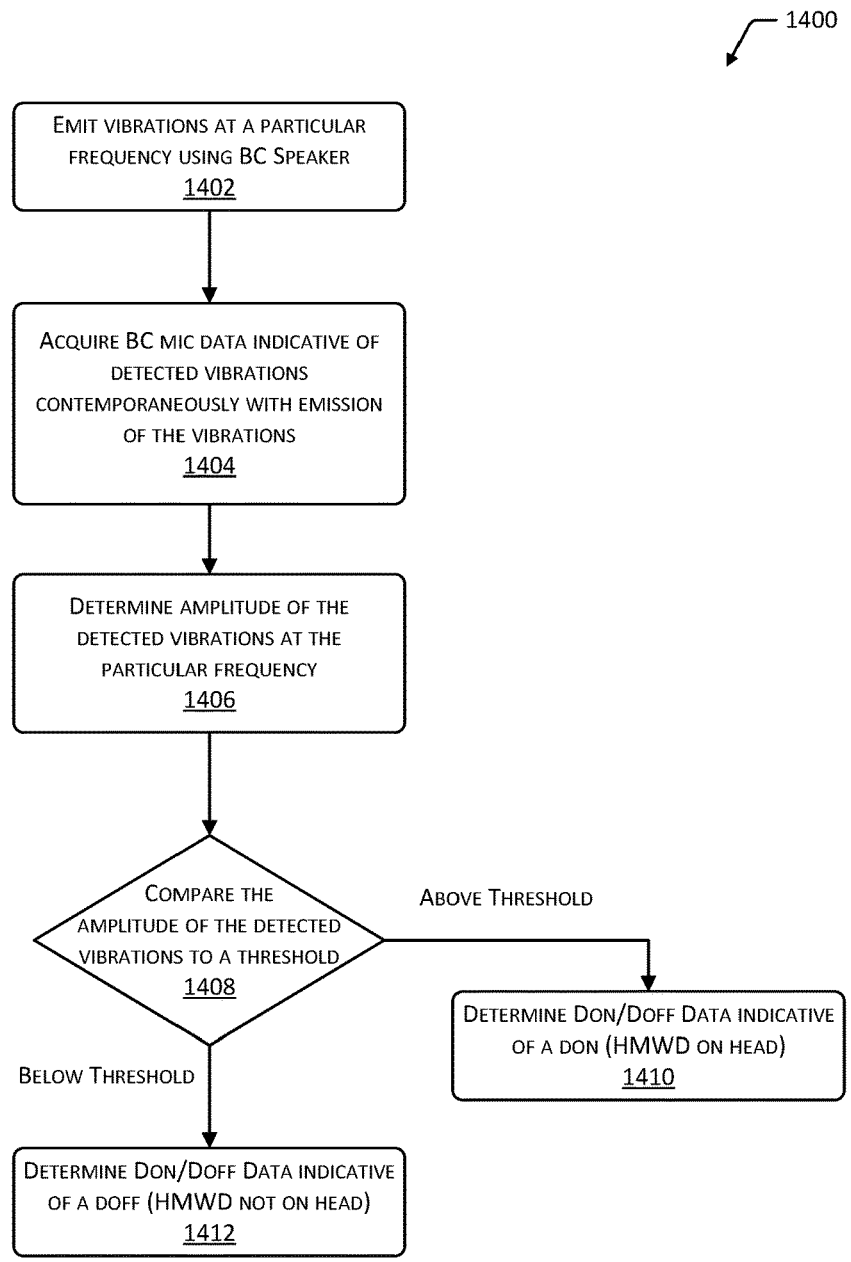
FIG. 14 depicts a flow diagram of a process for determining don/doff data by analyzing vibrations emitted the BC speaker and detected by the BC microphone, according to some implementations.

FIG. 14 depicts a flow diagram 1400 of a process for determining don/doff data 124 by analyzing vibrations 1202 emitted from the BC speaker 238 and detected by the BC microphone 214, according to some implementations. The process may be implemented at least in part by one or more of the HMWD 106, the computing device 108, servers 130, or other devices. For example, the processing module 122 executing on the processor 304 may implement this process.

At 1402, one or more of the BC speakers 238 emit vibrations 1202. The vibrations 1202 may be emitted at one or more of a particular frequency, pattern, phase, or other characteristic. For example, the processing module 122 may generate output data 120 comprising a particular tone to be presented using the BC speaker 238. In another example, the output data 120 may comprise speech, music, or other audio signals that may be intended to provide output to the user 102. In yet another example, the output data 120 may be configured to generate a particular pattern of vibrations. In some implementations, the vibration 1202 may have a predefined duration. For example, the vibration 1202 may be emitted by the BC speaker 238 for a duration of at least 1000 ms. A minimum duration may be used to produce BC mic data 216 that is deemed to be suitable for subsequent processing by the processing module 122.

At 1404, BC mic data 216 is acquired from the BC microphone 214 at the same time as the emission of the vibration 1202. The BC mic data 216 is indicative of vibration detection by the BC microphone 214, and may include information such as the frequency and amplitude of at least a portion of the detected vibrations.

At 1406, an amplitude of the detected vibrations at the particular frequency is determined. For example, the BC mic data 216 may comprise values that are indicative of the amplitude of a vibration at a particular frequency, bin, or range of frequencies.

At 1408, the amplitude of the detected vibrations is compared to the threshold 1308. If the amplitude is greater than or equal to the threshold 1308, the process proceeds to 1410.

As described above, in some implementations the vibrations 1202 used to present audio to the user 102 may also be used to determine the don/doff data 124. For example, the processing module 122 may receive a command to present audio output using the BC speaker 238. The audio output may include one or more frequencies between 500 Hz and 20,000 Hz. The vibration 1202 emitted by the BC speaker 238 may then comprise the audio output with these one or more frequencies. One or more techniques may be used to determine presence of at least a portion of the audio output in the BC mic data 216. For example, the audio output may be based on output data 120 such as audio of the person speaking, music, and so forth. A cross-correlation function may be used to determine if a portion of the BC mic data 216 and the output data 120 are above a threshold level of similarity. If the portion of the BC mic data 216 and the output data 120 are deemed to be similar enough, the amplitude of the BC speaker vibration 1306 and the received amplitude of the vibrations as represented by the BC mic data 216 may be compared to determine the don/doff data 124.

At 1410, don/doff data 124 indicative of the HMWD 106 being worn is determined.

Returning to 1408, if the amplitude of the BC mic data 216 is less than the threshold 1308, the process proceeds to 1412.

At 1412, don/doff data 124 indicative of the HMWD 106 being doffed 112 is determined.

In some implementations, other comparisons or analyses may be performed. For example, as described above, the amplitude of the vibrations 1202 determined in the BC mic data 216 may be assessed to determine if the time above or below the threshold 1308 is greater than a threshold amount of time. In another implementation, a sensor or switch may be used to determine if the HMWD 106 is in the folded or unfolded configuration. For example, when the sensor or switch indicates the HMWD 106 is in the folded configuration, don/doff data 124 may be generated that is indicative of the HMWD 106 being doffed 112. In one implementation, the amplitude of the detected vibrations may be used to determine if the HMWD 106 is in the folded or unfolded configuration.

A classifier may be used to process least a portion of the BC mic data 216 to determine if the BC mic data 216 is either indicative of being donned 110 or doffed 112. The classifier may be trained using the BC mic data 216 and data from other sensors or transducers that indicates don/doff data 124. For example, during training the user 102 may provide input on a computing device 108 indicating that they have donned 110 or doffed 112 the HMWD 106.

One or more of the various techniques described above may be used in conjunction with one another or at different times or in different operating modes to determine the don/doff data 124. For example, the techniques using the FSR sensors 202 may be used to determine a preliminary don/doff data 124 which then may be confirmed using the emission of the vibration 1202 from the BC speaker 238 and reception by the BC microphone 214. In another example, the don/doff data 124 may be determined based on a combination of the techniques using FSR sensor 202 and the analysis of the BC speaker data 240. In another example, all the techniques may be used in conjunction with one another. The sensor data 116 may be used to modify operation of the various devices. For example, if the FSR data 204 is indicative of a change in don/doff data 124, the BC speaker 238 may be activated and used to generate the vibration 1202 for detection by the BC microphone 214. In another example, if the BC speaker data 240 is indicative of a change in don/doff data 124, the BC microphone 214 may be activated. Activation may include, but is not limited to, transitioning a device or component from a low power state to a higher power or operational state.

While the examples described in this disclosure discuss the use and processing of digital signals, it is understood that in other implementations the signals may be processed in the analog domain, or in a hybrid analog and digital domain. For example, output voltages produced by the BC speaker 238 may be provided to analog circuitry that generates a pulse or interrupt signal when a particular voltage threshold is surpassed.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include but are not limited to signals that a computer system or machine hosting or running a computer program can be configured to access, including signals transferred by one or more networks. For example, the transitory machine-readable signal may comprise transmission of software by the Internet. Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Specific physical embodiments as described in this disclosure provided by way of illustration and not necessarily as a limitation. Those having ordinary skill in the art readily recognize that alternative implementations, variations, and so forth may also be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features, structures, and acts are disclosed as exemplary forms of implementing the claims.

What is claimed is:

1. A system comprising:
a head-mounted wearable device (HMWD) comprising:
a bone conduction (BC) microphone;
a memory, storing computer-executable instructions; and
a hardware processor to execute the computer-executable instructions to:
acquire BC microphone data from the BC microphone, wherein the BC microphone data is indicative of amplitude of detected vibrations;
determine the amplitude of the detected vibrations based on the BC microphone data;
when the amplitude is below a threshold, generate data indicative of the HMWD not being worn; and
when the amplitude is greater than or equal to the threshold, generate data indicative of the HMWD being worn.

2. The system of claim 1, wherein the detected vibrations comprise longitudinal waves having a frequency of between 70 Hertz and 500 Hertz.

3. The system of claim 1, further comprising a bone conduction (BC) speaker, the hardware processor to further execute the computer-executable instructions to:
acquire, using the BC speaker, BC speaker data indicative of a time-varying voltage produced by a piezoelectric element; and
determine that the BC speaker data exceeds one or more of a first threshold value or a second threshold value, wherein the first threshold value is indicative of a positive voltage, the second threshold value is indicative of a negative voltage, and one or more of the data indicative of the HMWD not being worn or the data indicative of the HMWD being worn is further determined based at least in part on the BC speaker data.

4. A system comprising:
a head-mounted wearable device (HMWD) comprising:
a bone conduction (BC) microphone;
a memory, storing computer-executable instructions; and
a hardware processor to execute the computer-executable instructions to:
acquire, at a first time, BC microphone data from the BC microphone, wherein the BC microphone data is indicative of vibration associated with a user wearing the HMWD; determine, based on the BC microphone data, don/doff data indicative of the HMWD being doffed.

5. The system of claim 4, the computer-executable instructions to determine the don/doff data further comprising instructions to:
process at least a portion of the BC microphone data using a classifier to determine that the BC microphone data is indicative of the HMWD being donned or doffed.

6. The system of claim 4, wherein the vibration is detected for at least 1000 milliseconds.

7. The system of claim 4, further comprising a bone conduction (BC) speaker, the hardware processor to further execute the computer-executable instructions to:
receive a command to present audio output, using the BC speaker, that includes one or more frequencies between 500 Hertz and 20,000 Hertz, wherein at least a portion of the vibration detected by the BC microphone comprises the audio output; and
determine that a cross-correlation between at least a portion of the audio output and at least a portion of the BC microphone data exceeds a threshold value.

8. The system of claim 4, the hardware processor to further execute computer-executable instructions to:
access previously stored propagation characteristics indicative of measured attenuation of vibrations at a plurality of frequencies;
determine current propagation characteristics based on information indicative of the vibration and the BC microphone data;

determine that the previously stored propagation characteristics and the current propagation characteristics correspond to within a threshold value; and determine a user identity associated with the previously stored propagation characteristics.

9. The system of claim 4, wherein the BC microphone data is indicative of vibration associated with one or more of a cardiac pulse of the user, sound associated with a head of the user, or motion associated with the head of the user.

10. A system comprising:
a head-mounted wearable device (HMWD) comprising:
a bone conduction (BC) microphone;
a memory, storing computer-executable instructions; and
a hardware processor to execute the computer-executable instructions to:
acquire BC microphone data from the BC microphone, wherein the BC microphone data is indicative of a vibration associated with a user wearing the HMWD;
determine one or more characteristics for at least a portion of the BC microphone data, wherein the one or more characteristics include a zero crossing rate and an energy value;
compare at least one of the one or more characteristics to respective threshold values, wherein the respective threshold values specify a threshold zero crossing rate value associated with human speech and a threshold energy value associated with human speech; and
determine don/doff data indicative of whether the HMWD is donned or doffed.

11. The system of claim 1, the computer-executable instructions to determine the one or more characteristics further comprising instructions to:
process the at least a portion of the BC microphone data using a classifier to determine that the at least a portion of the BC microphone data is indicative of the HMWD being donned or doffed.

12. The system of claim 10, the computer-executable instructions to determine the one or more characteristics further comprising instructions to determine one or more of:
a spectra indicative of energy with respect to frequency of the BC microphone data, or a spectra indicative of energy with respect to time of the BC microphone data.

13. The system of claim 10, wherein the BC microphone further comprises one or more of an accelerometer, a transducer, an electromagnetic element, a force sensitive resistor, or a microelectromechanical system (MEMS), is configured to output a signal associated with the vibration, and the BC microphone data includes at least a portion of the signal received by the BC microphone.

14. A head-mounted wearable device (HMWD) comprising:
a front frame;
a first temple connected to a first side of the front frame;
a second temple connected to a second side of the front frame;
a bone conduction (BC) microphone;
a first circuit board in the first temple;
a first force sensitive resistor (FSR) mounted to the first circuit board, wherein the first BC speaker is mounted to the first FSR;
a memory, storing computer-executable instructions; and
a hardware processor to execute the computer-executable instructions to:
acquire BC microphone data from the BC microphone, wherein the BC microphone data is indicative of a vibration associated with a user wearing the HMWD;
acquire first FSR data from the first FSR, wherein the first FSR data comprises one or more first force measurement values (FMVs); and
determine don/doff data indicative of whether the HMWD is donned or doffed based at least in part on the BC microphone data and the first FSR data.

15. The HMWD of claim 14, further comprising:
a second circuit board in the second temple;
a second force sensitive resistor (FSR) mounted to the second circuit board; and
the hardware processor to further execute the computer-executable instructions to:
acquire second FSR data from the second FSR, wherein the second FSR data comprises one or more second force measurement values (FMVs) and the don/doff data is further determined based at least in part on the second FSR data.

16. The HMWD of claim 15, wherein the first FSR is positioned to detect a force applied to a first interior side of the first temple and the second FSR is positioned to detect a force applied to a second interior side of the second temple, the hardware processor to further execute the computer-executable instructions to analyze the one or more first FMVs and the one or more second FMVs by determining that the one or more first FMVs and the one or more second FMVs are indicative of force exceeding a threshold value for a period of time.

17. A head-mounted wearable device (HMWD) comprising:
a bone conduction (BC) microphone;
a bone conduction (BC) speaker including a piezoelectric element;
a memory, storing computer-executable instructions; and
a hardware processor to execute the computer-executable instructions to:
acquire BC microphone data from the BC microphone, wherein the BC microphone data is indicative of a vibration associated with a user wearing the HMWD;
acquire BC speaker data from the BC speaker, wherein the BC speaker data is indicative of a time-varying voltage produced by the piezoelectric element;
determine that the BC speaker data exceeds one or more threshold values indicative of a voltage; and
determine don/doff data indicative of whether the HMWD is donned or doffed based at least in part on the BC microphone data and the BC speaker data.

18. The HMWD of claim 17, wherein the one or more threshold values include a first threshold value indicative of a positive voltage and a second threshold value indicative of a negative voltage, and a magnitude of the first threshold value is greater than a magnitude of the second threshold value.

19. The HMWD of claim 17, further comprising computer-executable instructions to acquire the BC speaker data when the BC speaker is idle.

20. A system comprising:
a device comprising:
a bone conduction (BC) microphone; and
a bone conduction (BC) speaker;
a memory, storing computer-executable instructions; and
a hardware processor to execute the computer-executable instructions to:
emit a signal using the BC speaker;

detect at least a portion of the signal using the BC microphone;

determine one or more characteristics of the at least a portion of the signal detected using the BC microphone, wherein the one or more characteristics are indicative of an amplitude of the signal; and based on the one or more characteristics, determine data indicative of the device being doffed.

21. The system of claim 20, further comprising a voice activity detector and computer-executable instructions to determine data from the voice activity detector, wherein the data indicative of the device being doffed is determined in response to the data from the voice activity detector.

22. A system comprising:

a device comprising a bone conduction (BC) microphone;

a memory, storing computer-executable instructions; and a hardware processor to execute the computer-executable instructions to:

detect a signal using the BC microphone;

determine a characteristic of at least a portion of the signal, wherein the characteristic is indicative of one or more of: an amplitude, a zero crossing rate, an energy, a spectra, or a phase angle; and based on the characteristic, determine data indicative of the device being doffed.

23. The system of claim 22, further comprising computer-executable instructions to determine data from a voice activity detector, wherein the data indicative of the device being doffed is determined in response to the data from the voice activity detector.

* * * * *

UNITED STATES PATENT AND TRADEMARK OFFICE
CERTIFICATE OF CORRECTION

PATENT NO. : 10,750,302 B1
APPLICATION NO. : 15/276649
DATED : August 18, 2020
INVENTOR(S) : Xuan Zhong et al.

Page 1 of 1

It is certified that error appears in the above-identified patent and that said Letters Patent is hereby corrected as shown below:

In the Claims
Column 27, Claim 11, Line 33:
Delete "The system of claim 1,".
Insert --The system of claim 10,--.

Signed and Sealed this
Sixth Day of October, 2020

Andrei Iancu
*Director of the United States Patent and Trademark Office*